United States Patent
Chaphalkar et al.

(10) Patent No.: US 10,254,746 B2
(45) Date of Patent: Apr. 9, 2019

(54) SYSTEMS AND METHODS FOR USING SMART MODELS IN MANUFACTURING

(71) Applicant: DMG Mori Seiki USA, Hoffman Estates, IL (US)

(72) Inventors: Nitin Chaphalkar, Schaumburg, IL (US); Gregory A. Hyatt, South Barrington, IL (US)

(73) Assignee: DMG MORI SEIKI USA, Hoffman Estates, IL (US)

( * ) Notice: Subject to any disclaimer, the term of this patent is extended or adjusted under 35 U.S.C. 154(b) by 0 days.

(21) Appl. No.: 15/320,993

(22) PCT Filed: Jun. 26, 2015

(86) PCT No.: PCT/US2015/038082
§ 371 (c)(1),
(2) Date: Dec. 21, 2016

(87) PCT Pub. No.: WO2015/200839
PCT Pub. Date: Dec. 30, 2015

(65) Prior Publication Data
US 2017/0205806 A1    Jul. 20, 2017

Related U.S. Application Data

(60) Provisional application No. 62/017,325, filed on Jun. 26, 2014.

(51) Int. Cl.
*G05B 19/4097*    (2006.01)

(52) U.S. Cl.
CPC .............. *G05B 19/4097* (2013.01); *G05B 2219/35134* (2013.01); *G05B 2219/49004* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 7,016,745 B1 * | 3/2006 | Dickerson | G05B 19/4093 700/182 |
| 2004/0075196 A1 | 4/2004 | Leyden et al. | |

(Continued)

OTHER PUBLICATIONS

International Search report for corresponding International Application No. PCT/US15/38082 filed on Jun. 26, 2015; Report dated Sep. 29, 2015.

*Primary Examiner* — Ryan A Jarrett
(74) *Attorney, Agent, or Firm* — Miller, Matthias & Hull LLP

(57) ABSTRACT

A system is provided for manufacturing a part. The system includes a manufacturing machine that includes at least one additive manufacturing tool. The system further includes a computer numerical control (CNC) controller operatively associated with the manufacturing machine and configured to control the at least one additive manufacturing tool based on computer aided manufacturing (CAM) instructions. The system further includes a CAM controller operatively associated with the CNC controller and configured to determine the CAM instructions based on computer aided drafting (CAD) instructions, the CAM instructions including a plurality of CAM operation control functions, each of the plurality of CAM operation control functions correlated with at least one of a plurality of CAD operation control functions of the CAD instructions.

20 Claims, 22 Drawing Sheets

(56) References Cited

U.S. PATENT DOCUMENTS

2010/0305742 A1 12/2010 Twelves, Jr. et al.
2014/0136154 A1 5/2014 Bojarski et al.
2014/0163717 A1 6/2014 Das et al.

* cited by examiner

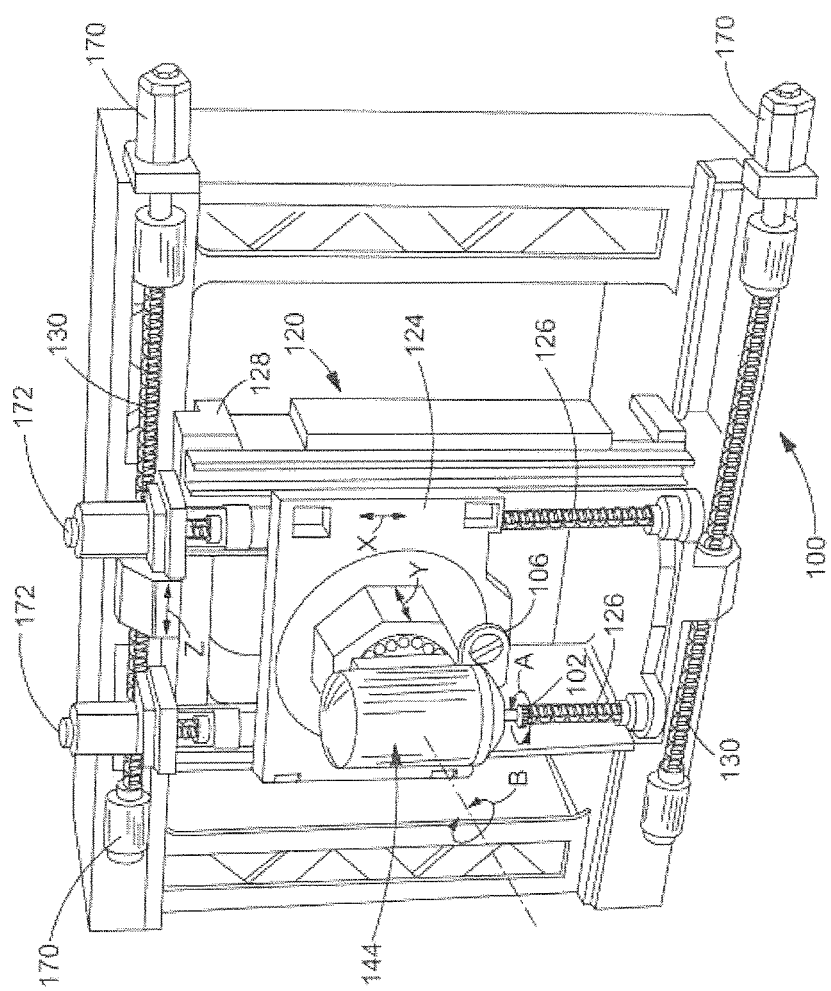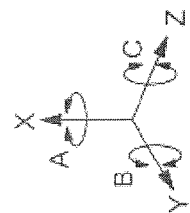
FIG. 4

SYSTEMS AND METHODS FOR USING SMART MODELS IN MANUFACTURING

BACKGROUND

Technical Field

The present disclosure generally relates to hybrid manufacturing centers capable of performing both additive and hybrid manufacturing procedures, and more particularly, to systems and methods for utilizing smart models in a computer aided drafting (CAD) environment in conjunction with manufacturing machines.

Description of the Related Art

Hybrid manufacturing processes have been developed that combine additive and subtractive manufacturing steps to form a part. Accordingly, a hybrid manufacturing process may be used to make or to grow a part through the use of sequential additive and subtractive methods. During additive manufacturing, a part may be created or grown by depositing powder and then selectively fusing the powder in specific areas to create a solid object. Subtractive methods then may be used to remove unwanted material from the solid object formed during the additive manufacturing process. The subtractive methods may be used to improve fit between parts and improve surface qualities. With the advent of hybrid manufacturing, the manufacturable world of part designs has been significantly expanded.

Computer aided drafting (CAD) manufacturing processes have been recently developed that may be used as guidelines for manufacturing a part using, for example, additive or hybrid manufacturing techniques. Typically, such guidelines are then imported into a computer aided manufacturing (CAM) system, as a whole, and then used for manufacturing by identifying the features to be machined or features to be machined and/or deposited.

Currently, hybrid manufacturing process development is a complicated and actively pursued field of study that considers when to add material, when to subtract, from where to add material, the sequence of operation, and other manufacturing considerations. More specifically, when making a CAD model, the user employs a set of design processes (e.g., extrude, cutout, etc.) to form the model. While this design process information is retained in the CAD environment, it is not generally retained in the model provided to the CAM environment, as the CAM environment typically requires only the completed model. Accordingly, in conventional processes, the model imported into the CAM environment does not include any of the design information which indicates the sequence or processes used to create the model.

In general, CAD and CAM instructions for manufacturing a part using a hybrid machine have been developed independent of one another, and therefore have overlooked synergies that may result from correlating CAD commands with CAM commands.

SUMMARY OF THE DISCLOSURE

In accordance with one aspect of the present disclosure, a system is provided for manufacturing a part. The system includes a manufacturing machine that includes at least one additive manufacturing tool. The system further includes a computer numerical control (CNC) controller operatively associated with the hybrid manufacturing machine and configured to control the at least one additive manufacturing tool and the at least one subtractive manufacturing tool based on computer aided manufacturing (CAM) instructions. The system further includes a CAM controller operatively associated with the CNC controller and configured to determine the CAM instructions based on computer aided drafting (CAD) instructions, the CAM instructions including a plurality of CAM operation control functions, each of the plurality of CAM operation control functions correlated with at least one of a plurality of CAD operation control functions of the CAD instructions.

In accordance with another aspect of the present disclosure, a method is provided for hybrid manufacturing a part using a hybrid manufacturing machine, the hybrid manufacturing machine including at least one additive manufacturing tool. The method includes receiving CAD instructions for manufacturing the part, the CAD instructions including a plurality of CAD operation control functions. The method further includes determining CAM instructions based on, at least, the CAD instructions, the CAM instructions including a plurality of CAM operation control functions, each of the plurality of CAM operation control functions correlated with at least one of the plurality of CAD operation control functions. The method further includes guiding a first toolpath of the at least one additive manufacturing tool based on the CAM instructions.

In accordance with another aspect of the present disclosure, a hybrid manufacturing machine is provided. The manufacturing machine includes a processing head assembly for additive manufacturing. The manufacturing machine further includes a computer numerical control (CNC) controller operatively associated with the manufacturing machine and configured to control the at least one additive manufacturing tool based on computer aided manufacturing (CAM) instructions. The manufacturing machine further includes a CAM controller operatively associated with the CNC controller and configured to determine the CAM instructions based on computer aided drafting (CAD) instructions, the CAM instructions including a plurality of CAM operation control functions, each of the plurality of CAM operation control functions correlated with at least one of a plurality of CAD operation control functions of the CAD instructions.

In accordance with another aspect of the present disclosure, which may be combined with one or more of the other aspects identified herein, the system for hybrid manufacturing a part may further include a CAD controller for generating the CAD instructions and providing the CAD instructions to the CAM controller.

In accordance with another aspect of the present disclosure, which may be combined with one or more of the other aspects identified herein, the CAD controller may be configured to provide correlations between the plurality of CAM operation control functions and the plurality of CAD operation control functions.

In accordance with another aspect of the present disclosure, which may be combined with one or more of the other aspects identified herein, the CAD controller may be configured to generate the CAD instructions based on material properties guidelines, the material properties guidelines being based on material properties of materials used by the hybrid manufacturing machine in manufacturing the part.

In accordance with another aspect of the present disclosure, which may be combined with one or more of the other aspects identified herein, the plurality of CAD control functions may include at least, extrude, revolve, and sweep functions, the plurality CAM control functions may include, at least, a deposition function, and each of the extrude, revolve, and sweep functions may be correlated with the deposition function.

In accordance with another aspect of the present disclosure, which may be combined with one or more of the other aspects identified herein, the plurality of CAD control functions may include, at least a selective sweep function, the plurality of CAM control functions include, at least, a binary deposition function, and the selective sweep function is correlated with the binary deposition function.

In accordance with another aspect of the present disclosure, which may be combined with one or more of the other aspects identified herein, the manufacturing machine may further include at least one subtractive manufacturing tool and the CNC controller is configured to operate the at least one subtractive manufacturing tool.

In accordance with another aspect of the present disclosure, which may be combined with one or more of the other aspects identified herein, the plurality of CAD control functions may include, at least, a cut function, the plurality of CAM control functions may include, at least, milling and turning functions, and the cut function is correlated with each of the turning and milling functions.

In accordance with another aspect of the present disclosure, which may be combined with one or more of the other aspects identified herein, the plurality of CAD control functions may include, at least, a hole function, the plurality of CAM control functions may include, at least, a drilling function, and the hole function may be correlated with the drilling function.

In accordance with another aspect of the present disclosure, which may be combined with one or more of the other aspects identified herein, the plurality of CAD control functions may include, at least, a chamfer function, the plurality of CAM control functions may include, at least, an additive chamfer function and a subtractive chamfer function, and the chamfer function may be correlated with the additive chamfer function and the subtractive chamfer function.

In accordance with another aspect of the present disclosure, which may be combined with one or more of the other aspects identified herein, the plurality of CAD control functions may include, at least, a fillet function, the plurality of CAM control functions may include, at least, an additive fillet function and a subtractive fillet function, and the fillet function may be correlated with the additive fillet function and the subtractive fillet function.

In accordance with another aspect of the present disclosure, which may be combined with one or more of the other aspects identified herein, the CAD instructions may include a process plan for manufacturing the part and the CAM instructions may include a part build plan based on, at least, the process plan of the CAD instructions.

In accordance with another aspect of the present disclosure, which may be combined with one or more of the other aspects identified herein, the process plan may include, at least, a pattern for layer deposition.

In accordance with another aspect of the present disclosure, which may be combined with one or more of the other aspects identified herein, the method for manufacturing a part may further include determining CAD instructions.

In accordance with another aspect of the present disclosure, which may be combined with one or more of the other aspects identified herein, the method for manufacturing a part may further include correlating the plurality of CAM operation control functions with the CAD operation control functions.

In accordance with another aspect of the present disclosure, which may be combined with one or more of the other aspects identified herein, correlating the plurality of CAM operation control functions with the CAD operation control functions may include correlating extrude, revolve, and sweep functions of the CAD operation control functions with a deposition function of the CAM operation control functions.

In accordance with another aspect of the present disclosure, which may be combined with one or more of the other aspects identified herein, the manufacturing machine may further include at least one subtractive manufacturing tool and the method further includes guiding a second toolpath of the at least one subtractive manufacturing tool based on the CAM instructions.

In accordance with another aspect of the present disclosure, which may be combined with one or more of the other aspects identified herein, correlating the plurality of CAM operation control functions with the CAD operation control functions includes correlating a cut function of the CAD operation control functions with at least one of a milling function and a turning function of the CAM operation control functions.

BRIEF DESCRIPTION OF THE DRAWINGS

For a more complete understanding of the disclosed methods and apparatus, reference should be made to the embodiment illustrated in greater detail on the accompanying drawings, wherein:

FIG. 4 a perspective view, enlarged with respect to FIG. 3 illustrating the machining spindle and the horizontally and vertically disposed rails via which the spindle may be translated.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Any suitable apparatus may be employed in conjunction with the methods disclosed herein. In some embodiments, the methods are performed using a computer numerically controlled machine, illustrated generally in FIGS. 1-10. A computer numerically controlled machine is itself provided in other embodiments. The machine 100 illustrated in FIGS. 1-10 is an NT-series machine, versions of which are available from DMG/Mori Seiki USA, the assignee of the present application. Alternatively, DMG/Mori Seiki's DMU-65 (a five-axis, vertical machine tool) machine tool, or other machine tools having different orientations or numbers of axes, may be used in conjunction with the apparatus and methods disclosed herein.

Figure 1:
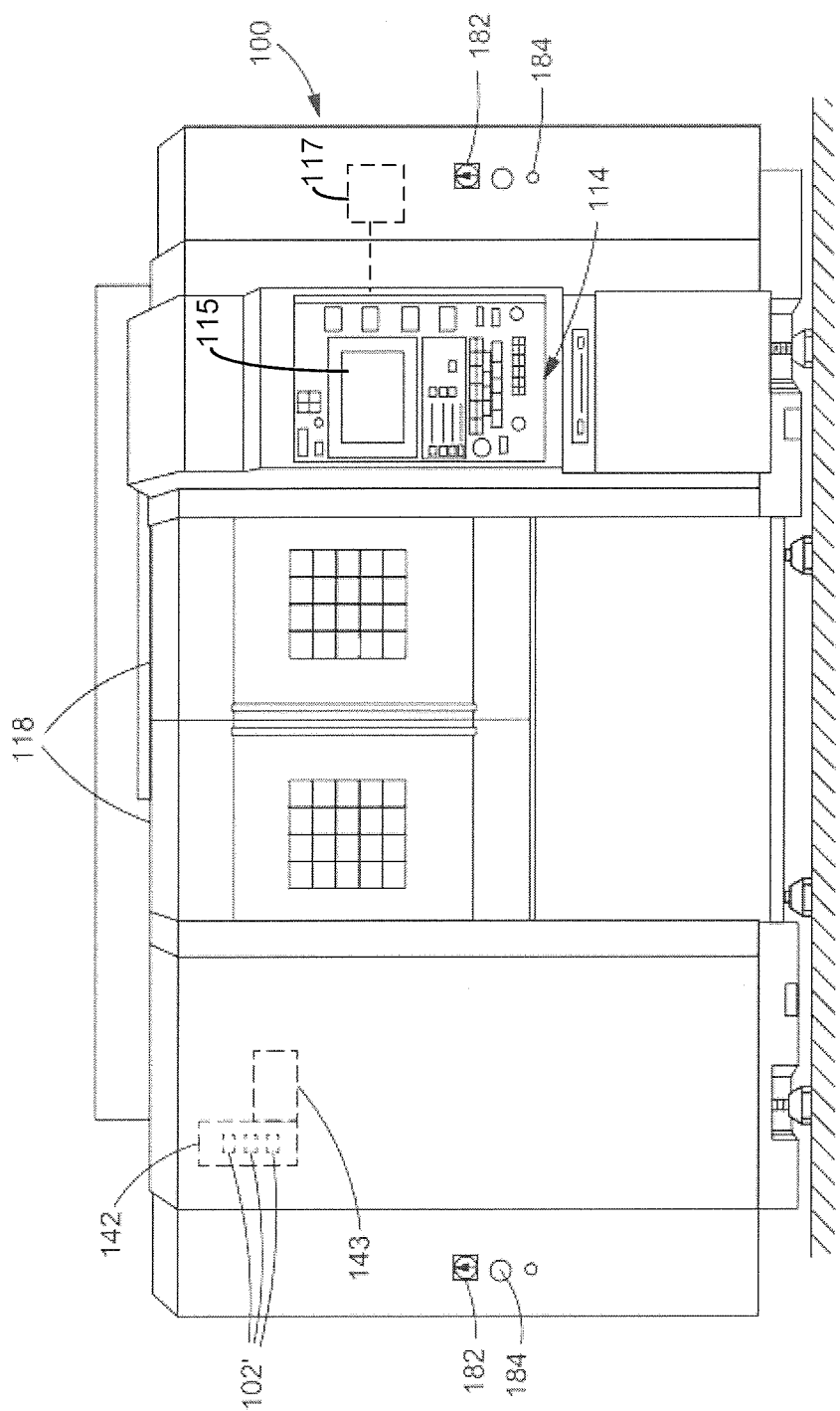
FIG. 1 is a front elevation of a computer numerically controlled machine in accordance with one embodiment of the present disclosure, shown with safety doors closed.
Figure 2:
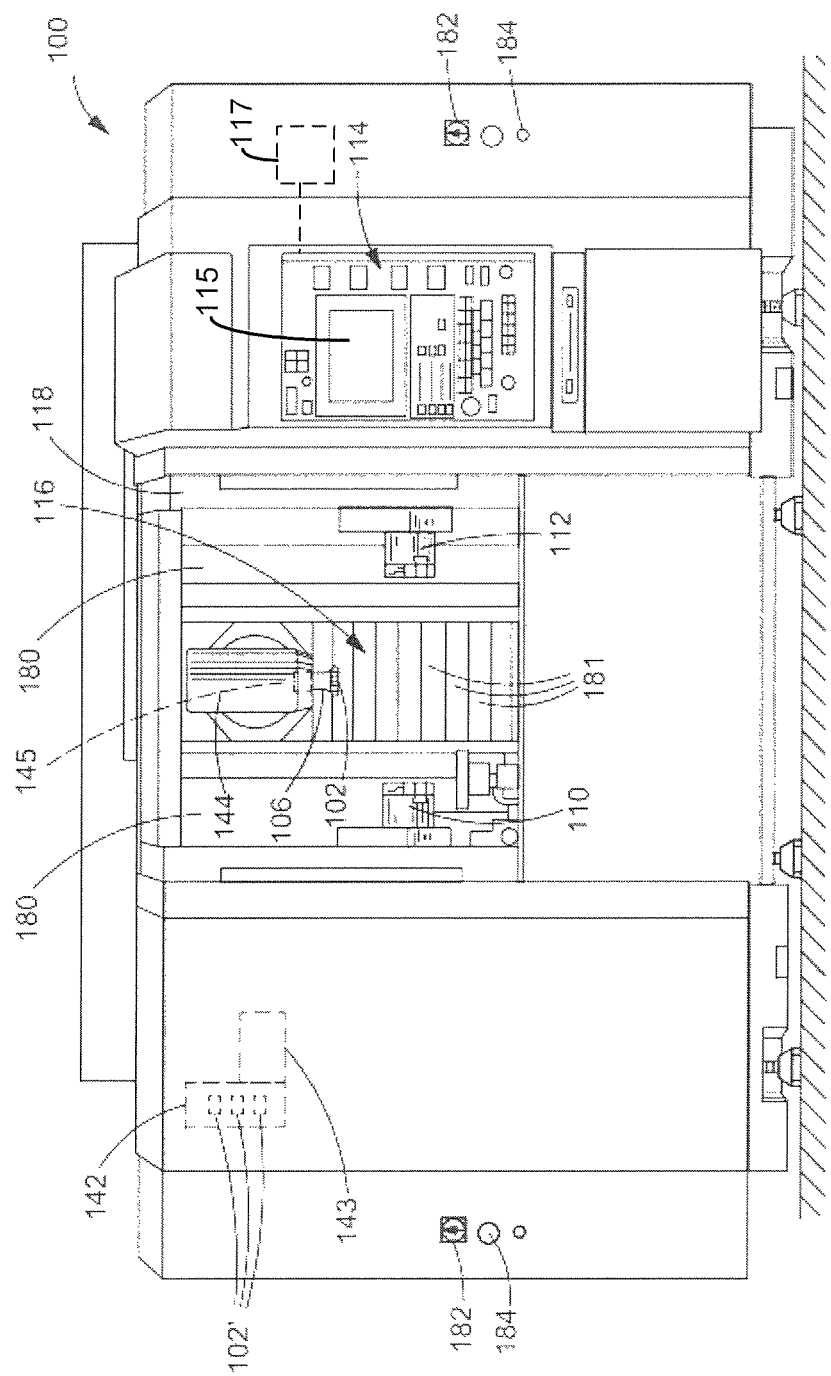
FIG. 2 is a front elevation of a computer numerically controlled machine illustrated in FIG. 1, shown with the safety doors open.
Figure 3:
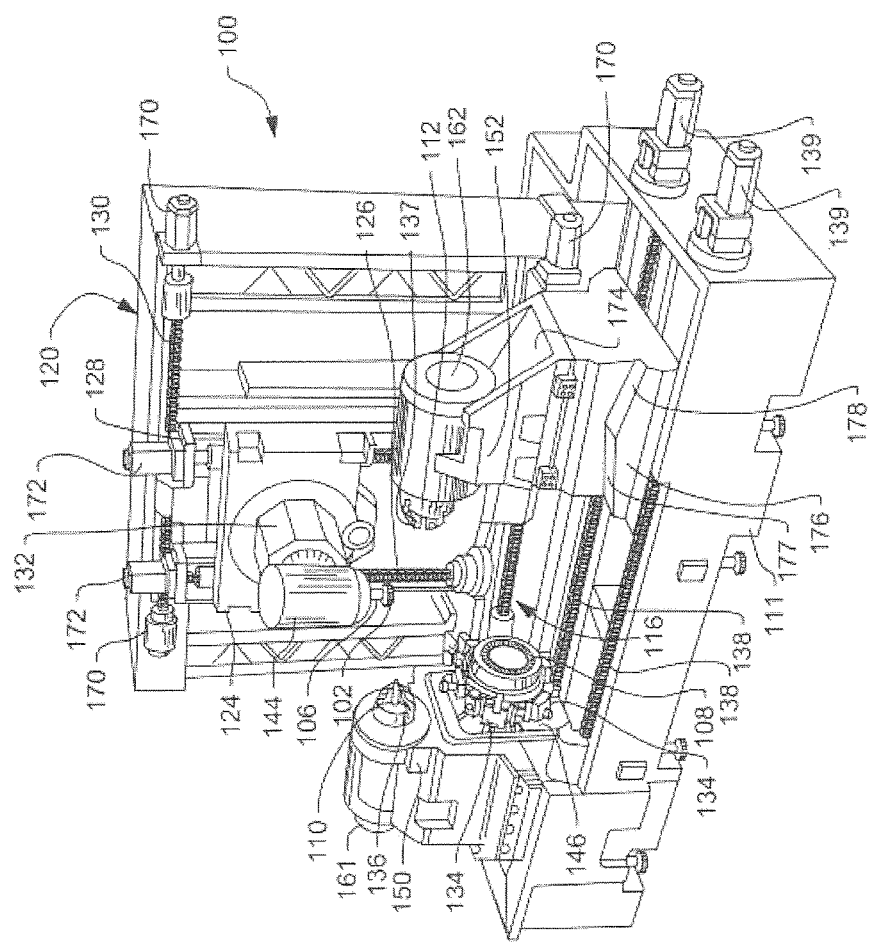
FIG. 3 is a perspective view of certain interior components of the computer numerically controlled machine illustrated in FIGS. 1 and 2, depicting a machining spindle, a first chuck, a second chuck, and a turret.

In general, with reference to the NT-series machine illustrated in FIGS. 1-3, one suitable computer numerically controlled machine 100 has at least a first retainer and a second retainer, each of which may be a tool retainer (such as a spindle retainer associated with spindle 144 or a turret retainer associated with a turret 108) or a workpiece retainer (such as chucks 110, 112). In the embodiment illustrated in the Figures, the computer numerically controlled machine 100 is provided with a spindle 144, a turret 108, a first chuck 110, and a second chuck 112. The computer numerically controlled machine 100 also has a computer control system operatively coupled to the first retainer and to the second retainer for controlling the retainers, as described in more detail below. It is understood that in some embodiments, the computer numerically controlled machine 100 may not contain all of the above components, and in other embodiments, the computer numerically controlled machine 100 may contain additional components beyond those designated herein.

As shown in FIGS. 1 and 2, the computer numerically controlled machine 100 has a machine chamber 116 in which various operations generally take place upon a workpiece (not shown). Each of the spindle 144, the turret 108, the first chuck 110, and the second chuck 112 may be completely or partially located within the machine chamber 116. In the embodiment shown, two moveable safety doors 118 separate the user from the machine chamber 116 to prevent injury to the user or interference in the operation of the computer numerically controlled machine 100. The safety doors 118 can be opened to permit access to the machine chamber 116 as illustrated in FIG. 2. The computer numerically controlled machine 100 is described herein with respect to three orthogonally oriented linear axes (X, Y, and Z), depicted in FIG. 4 and described in greater detail below. Rotational axes about the X, Y and Z axes are connoted "A," "B," and "C" rotational axes respectively.

The computer numerically controlled machine 100 is provided with a computer control system for controlling the various instrumentalities within the computer numerically controlled machine. In the illustrated embodiment, the machine is provided with two interlinked computer systems, a computer aided manufacturing (CAM) controller 114, which may include a user interface system 115, and a computer numerical control (CNC) controller 117 operatively connected to the CAM controller 114. The CNC controller 117 directly controls the operations of the spindle, the turret, and the other instrumentalities of the machine, while the CAM controller 114 allows an operator to control the CNC controller 117 based on CAM instructions. Collectively, the CNC controller 117 and the CAM controller 115, together with the various mechanisms for control of operations in the machine, may be considered a single computer control system. Further, while the CAM controller 114 is shown as a part of the machine 100, the CAM controller need not be part of the machine 100 and, alternatively, may be a computing device separate from the machine 100 that is in communication with the machine 100.

The computer control system may include machine control circuitry having a central processing unit (CPU) connected to a main memory. The CPU may include any suitable processor(s), such as those made by Intel and AMD. By way of example, the CPU may include a plurality of microprocessors including a master processor, a slave processor, and a secondary or parallel processor. Machine control circuitry, as used herein, comprises any combination of hardware, software, or firmware disposed in or outside of the machine 100 that is configured to communicate with or control the transfer of data between the machine 100 and a bus, another computer, processor, device, service, or network. The machine control circuitry, and more specifically the CPU, comprises one or more controllers or processors and such one or more controllers or processors need not be disposed proximal to one another and may be located in different devices or in different locations. The machine control circuitry, and more specifically the main memory, comprises one or more memory devices which need not be disposed proximal to one another and may be located in different devices or in different locations. The machine control circuitry is operable to execute all of the various machine tool methods and other processes disclosed herein.

In some embodiments, the user operates the user interface system to impart programming to the machine; in other embodiments, programs can be loaded or transferred into the machine via external sources. It is contemplated, for instance, that programs may be loaded via a PCMCIA interface, an RS-232 interface, a universal serial bus interface (USB), or a network interface, in particular a TCP/IP network interface. In other embodiments, a machine may be controlled via conventional PLC (programmable logic controller) mechanisms (not illustrated).

As further illustrated in FIGS. 1 and 2, the computer numerically controlled machine 100 may have a tool magazine 142 and a tool changer 143. These cooperate with the spindle 144 to permit the spindle to operate with any one of multiple tools. Generally, a variety of tools may be provided; in some embodiments, multiple tools of the same type may be provided.

An exemplary embodiment of a tool changer 300 is illustrated in greater detail in FIGS. 11 and 12(a) to 12(d). The tool changer 300 includes a tool magazine 302 for holding a plurality of tools. The tool magazine 302 may include a magazine base 304 and an endless carrier 306 supported for rotation relative to the magazine base 304. A plurality of tool pots 308 are coupled to the endless carrier 306 at a predetermined pitch, each tool pot 308 being configured to detachably receive an associated tool. A rotary motor 310 is operably coupled to the endless carrier 306 to index the tool magazine 302 as desired.

The tool changer 300 also includes a tool carrier 312 for extracting a subsequent tool T2 from a tool delivery position A of the tool magazine 302 and transferring it to a tool change position B. As best shown in FIGS. 11 and 12a-d, the tool carrier 312 may include a transfer rail 314 coupled to the magazine base 304 and extending from the tool delivery position A to the tool change position B. A transfer support 316 is slidably coupled to the transfer rail 314 and configured to engage the subsequent tool T2 positioned at the tool delivery position A from the tool pot 308. A transfer motor 318 is operably coupled to the transfer support 316 to reciprocate the transfer support 316 between the tool delivery position A and the tool change position B, thereby to remove the subsequent tool T2 from the tool pot 308.

The illustrated tool changer 300 further includes a tool exchange assembly 320 for exchanging a preceding tool T1 held by the spindle 144 for the subsequent tool T2 presented at the tool change position B. the tool exchange assembly 320 may include an exchange shaft 322 supported by and rotatable relative to the magazine base 304 and an exchange arm 324 coupled to the exchange shaft 322. An exchange drive 326 is operably coupled to the exchange shaft 322 to move the exchange shaft 322 in both axial and rotational directions.

Figure 12A:
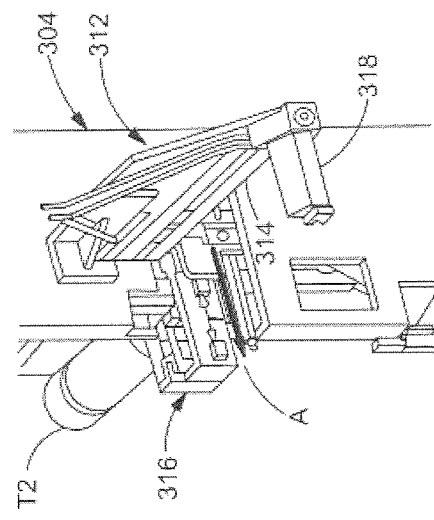
FIGS. 12(a) to 12(d) are perspective views showing operation of the tool changer of FIG. 11.
Figure 12D:
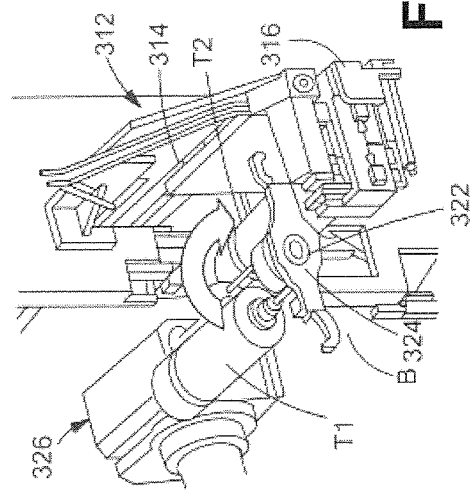
Figure 12B:
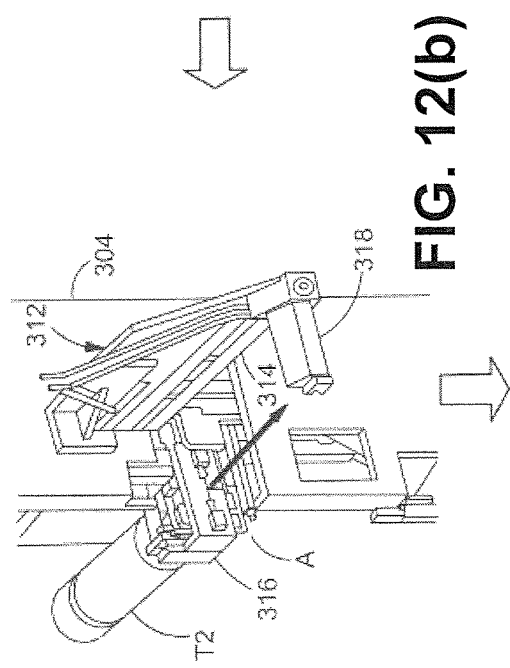
Figure 12C:
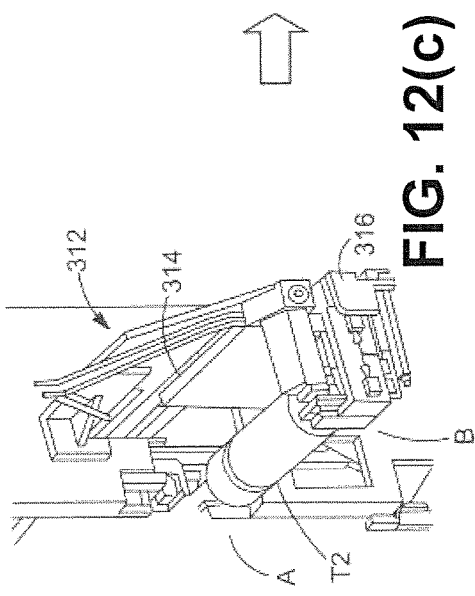

In operation, the tool changer 300 may be used to change the tool that is coupled to the spindle 144. The tool magazine 302 rotary-indexes the subsequent tool T2 to position it at the tool delivery position A, as shown in FIG. 12(a). The transfer support 316 engages the subsequent tool T2 positioned at the tool delivery position A and transfers it to the tool change position B, as shown in FIGS. 12(b) and 12(c). Next, the exchange arm 324 changes the preceding tool T1 attached to the spindle 144 to the subsequent tool T2 held by the transfer support 316, as shown in FIG. 12(d). Thereafter, the preceding tool T1 may be returned to a predetermined one of the tool pots 308 of the tool magazine 302, and the subsequent tool T2 attached to the spindle 144 may be used in a subsequent process.

The spindle 144 is mounted on a carriage assembly 120 that allows for translational movement along the X- and Z-axis, and on a ram 132 that allows the spindle 144 to be moved in the Y-axis. The ram 132 is equipped with a motor to allow rotation of the spindle in the B-axis, as set forth in more detail below. As illustrated, the carriage assembly has a first carriage 124 that rides along two threaded vertical rails (one rail shown at 126) to cause the first carriage 124 and spindle 144 to translate in the X-axis. The carriage assembly also includes a second carriage 128 that rides along two horizontally disposed threaded rails (one shown in FIG. 3 at 130) to allow movement of the second carriage 128 and spindle 144 in the Z-axis. Each carriage 124, 128 engages the rails via plural ball screw devices whereby rotation of the rails 126, 130 causes translation of the carriage in the X- or Z-direction respectively. The rails are equipped with motors 170 and 172 for the horizontally disposed and vertically disposed rails respectively.

The spindle 144 holds the tool 102 by way of a spindle connection and a tool retainer 106. The spindle connection 145 (shown in FIG. 2) is connected to the spindle 144 and is contained within the spindle 144. The tool retainer 106 is connected to the spindle connection and holds the tool 102. Various types of spindle connections are known in the art and can be used with the computer numerically controlled machine 100. Typically, the spindle connection is contained within the spindle 144 for the life of the spindle. An access plate 122 for the spindle 144 is shown in FIGS. 5 and 6.

The first chuck 110 is provided with jaws 136 and is disposed in a stock 150 that is stationary with respect to the base 111 of the computer numerically controlled machine 100. The second chuck 112 is also provided with jaws 137, but the second chuck 112 is movable with respect to the base 111 of the computer numerically controlled machine 100. More specifically, the machine 100 is provided with threaded rails 138 and motors 139 for causing translation in the Z-direction of the second stock 152 via a ball screw mechanism as heretofore described. To assist in swarf removal, the second stock 152 is provided with a sloped distal surface 174 and a side frame 176 with Z-sloped surfaces 177, 178. Hydraulic controls and associated indicators for the chucks 110, 112 may be provided, such as the pressure gauges 182 and control knobs 184 shown in FIGS. 1 and 2. Each stock is provided with a motor (161, 162 respectively) for causing rotation of the chuck.

Figure 5:
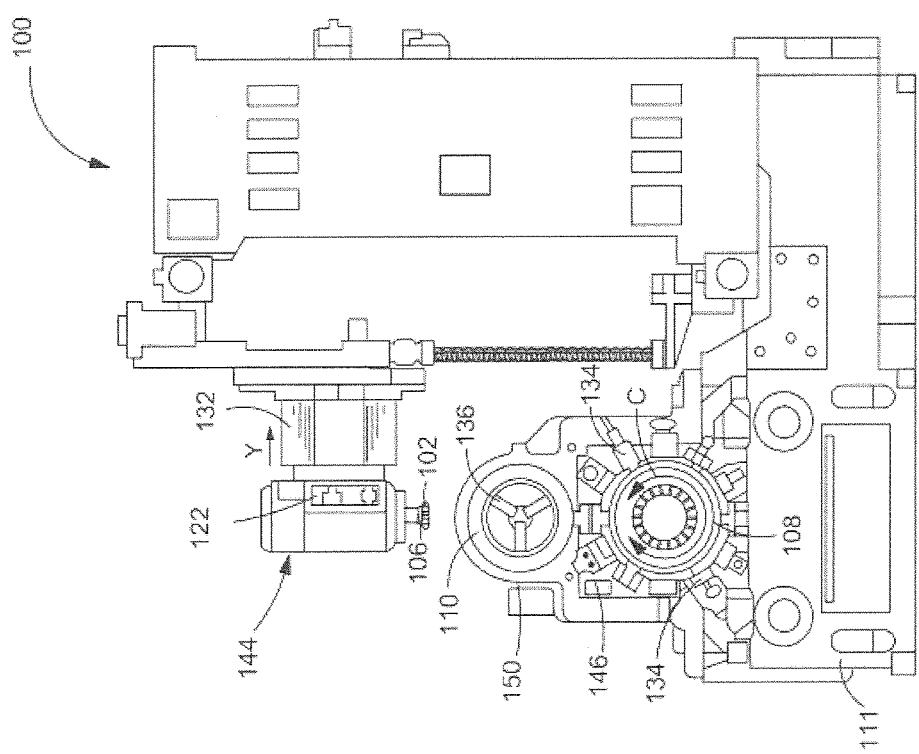
FIG. 5 is a side view of the first chuck, machining spindle, and turret of the machining center illustrated in FIG. 1.
Figure 6:
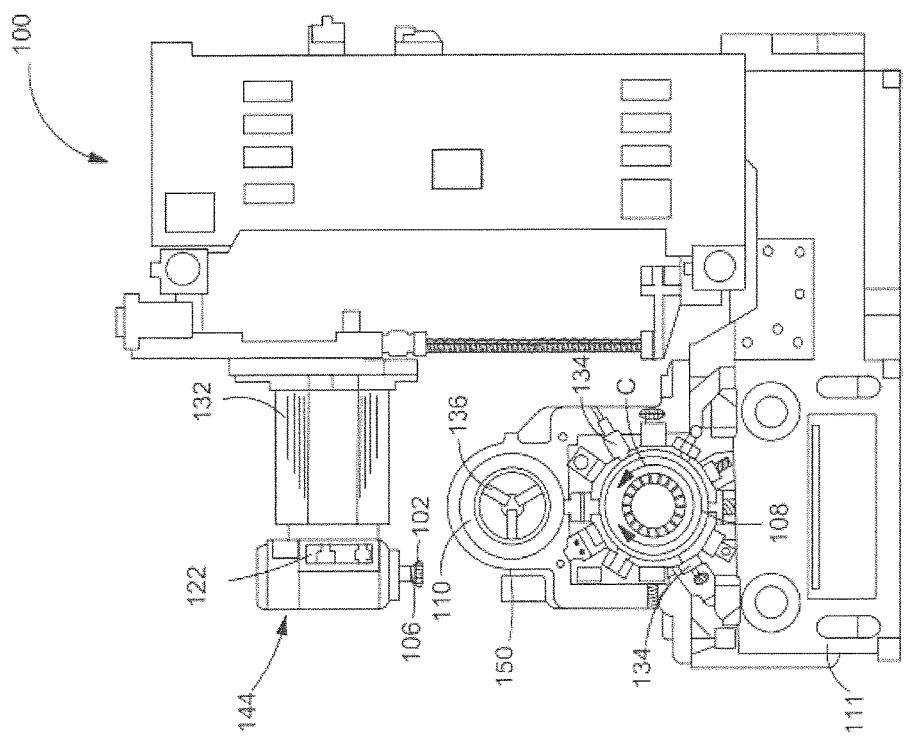
FIG. 6 is a view similar to FIG. 5 but in which a machining spindle has been translated in the Y-axis.
Figure 9:
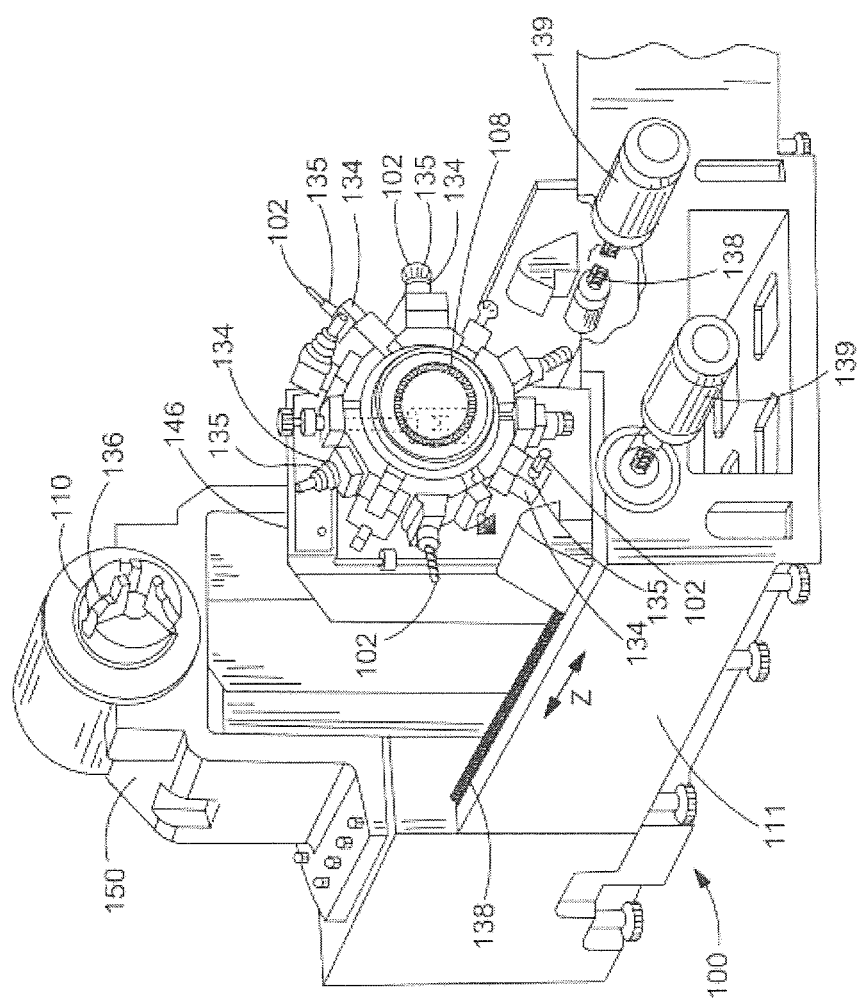
FIG. 9 is a perspective view of the first chuck and turret illustrated in FIG. 2, depicting movement of the turret and turret stock in the Z-axis relative to the position of the turret in FIG. 2.

The turret 108, which is best depicted in FIGS. 5, 6 and 9, is mounted in a turret stock 146 (FIG. 5) that also engages rails 138 and that may be translated in a Z-direction, again via ball-screw devices. The turret 108 is provided with various turret connectors 134, as illustrated in FIG. 9. Each turret connector 134 can be connected to a tool retainer 135 or other connection for connecting to a tool. Since the turret 108 can have a variety of turret connectors 134 and tool retainers 135, a variety of different tools can be held and operated by the turret 108. The turret 108 may be rotated in a C' axis to present different ones of the tool retainers (and hence, in many embodiments, different tools) to a workpiece.

Figure 7:
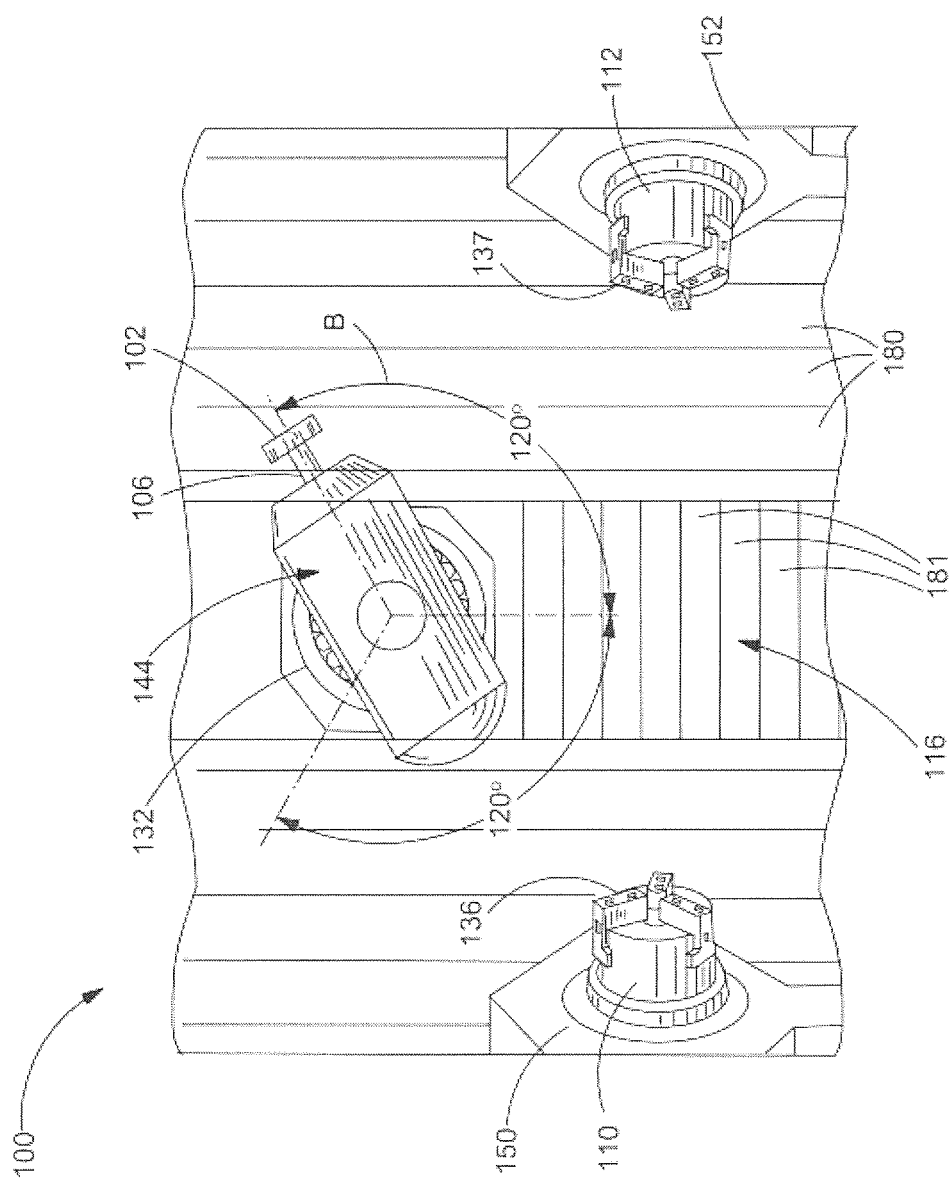
FIG. 7 is a front view of the spindle, first chuck, and second chuck of the computer numerically controlled machine illustrated in FIG. 1, including a line depicting the permitted path of rotational movement of this spindle.
Figure 8:
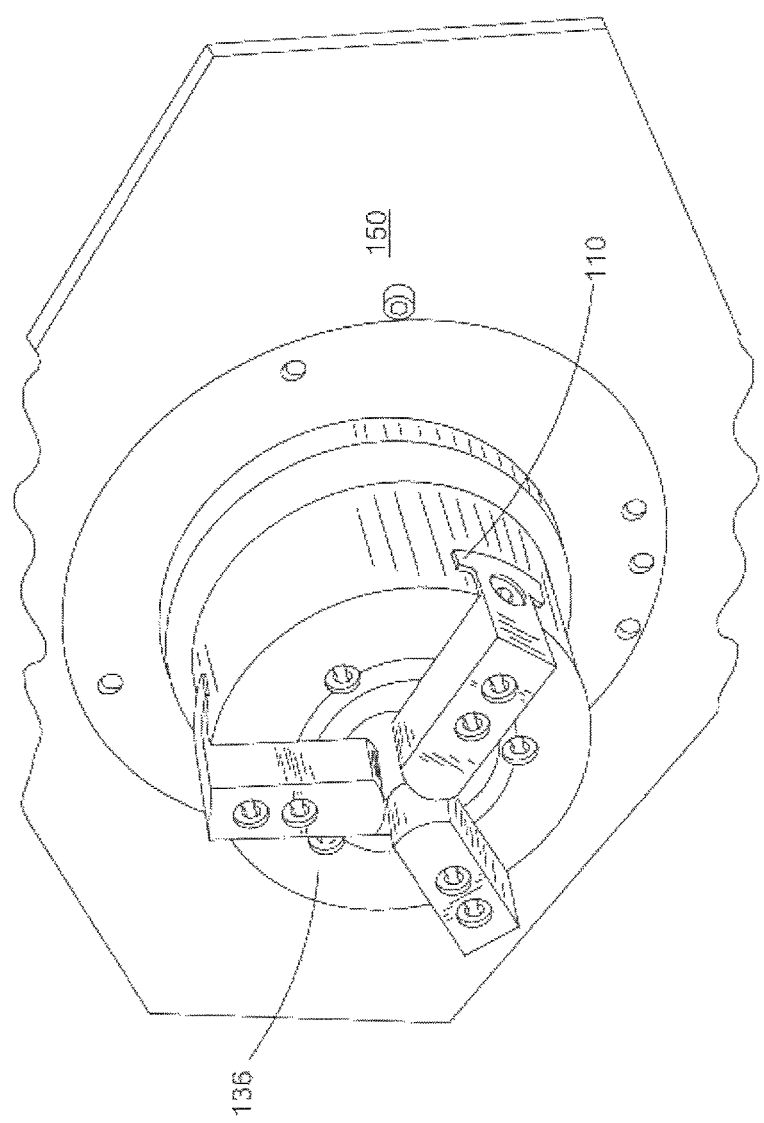
FIG. 8 is a perspective view of the second chuck illustrated in FIG. 3, enlarged with respect to FIG. 3.

It is thus seen that a wide range of versatile operations may be performed. With reference to tool 102 held in tool retainer 106, such tool 102 may be brought to bear against a workpiece (not shown) held by one or both of chucks 110, 112. When it is necessary or desirable to change the tool 102, a replacement tool 102 may be retrieved from the tool magazine 142 by means of the tool changer 143. With reference to FIGS. 4 and 5, the spindle 144 may be translated in the X and Z directions (shown in FIG. 4) and Y direction (shown in FIGS. 5 and 6). Rotation in the B axis is depicted in FIG. 7, the illustrated embodiment permitting rotation within a range of 120 degrees to either side of the vertical. Movement in the Y direction and rotation in the B axis are powered by motors (not shown) that are located behind the carriage 124.

Generally, as seen in FIGS. 2 and 7, the machine is provided with a plurality of vertically disposed leaves 180 and horizontal disposed leaves 181 to define a wall of the machine chamber 116 and to prevent swarf from exiting this chamber.

The components of the machine 100 are not limited to the heretofore described components. For instance, in some instances an additional turret may be provided. In other instances, additional chucks and/or spindles may be provided. Generally, the machine is provided with one or more mechanisms for introducing a cooling liquid into the machine chamber 116.

In the illustrated embodiment, the computer numerically controlled machine 100 is provided with numerous retainers. Chuck 110 in combination with jaws 136 forms a retainer, as does chuck 112 in combination with jaws 137. In many instances these retainers will also be used to hold a workpiece. For instance, the chucks and associated stocks will function in a lathe-like manner as the headstock and optional tailstock for a rotating workpiece. Spindle 144 and spindle connection 145 form another retainer. Similarly, the turret 108, when equipped with plural turret connectors 134, provides a plurality of retainers (shown in FIG. 9).

The computer numerically controlled machine 100 may use any of a number of different types of tools known in the art or otherwise found to be suitable. For instance, the tool 102 may be a cutting tool such as a milling tool, a drilling tool, a grinding tool, a blade tool, a broaching tool, a turning tool, or any other type of cutting tool deemed appropriate in connection with a computer numerically controlled machine 100. Additionally or alternatively, the tool may be configured for an additive manufacturing technique, as discussed in greater detail below. In either case, the computer numerically controlled machine 100 may be provided with more than one type of tool, and via the mechanisms of the tool changer 143 and tool magazine 142, the spindle 144 may be caused to exchange one tool for another. Similarly, the turret 108 may be provided with one or more tools 102, and the operator may switch between tools 102 by causing rotation of the turret 108 to bring a new turret connector 134 into the appropriate position.

Figure 10:
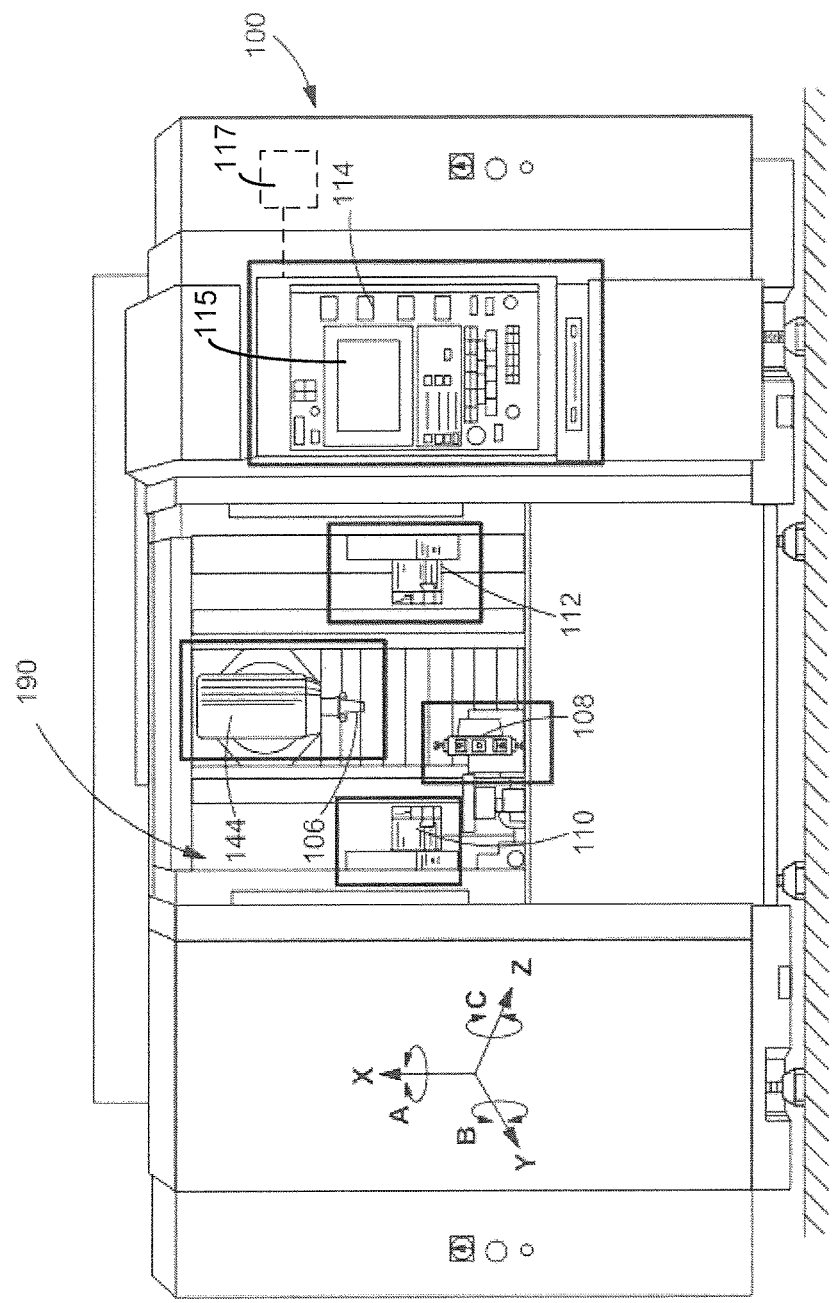
FIG. 10 is a front view of the computer numerically controlled machine of FIG. 1 with the front doors open.
Figure 11:
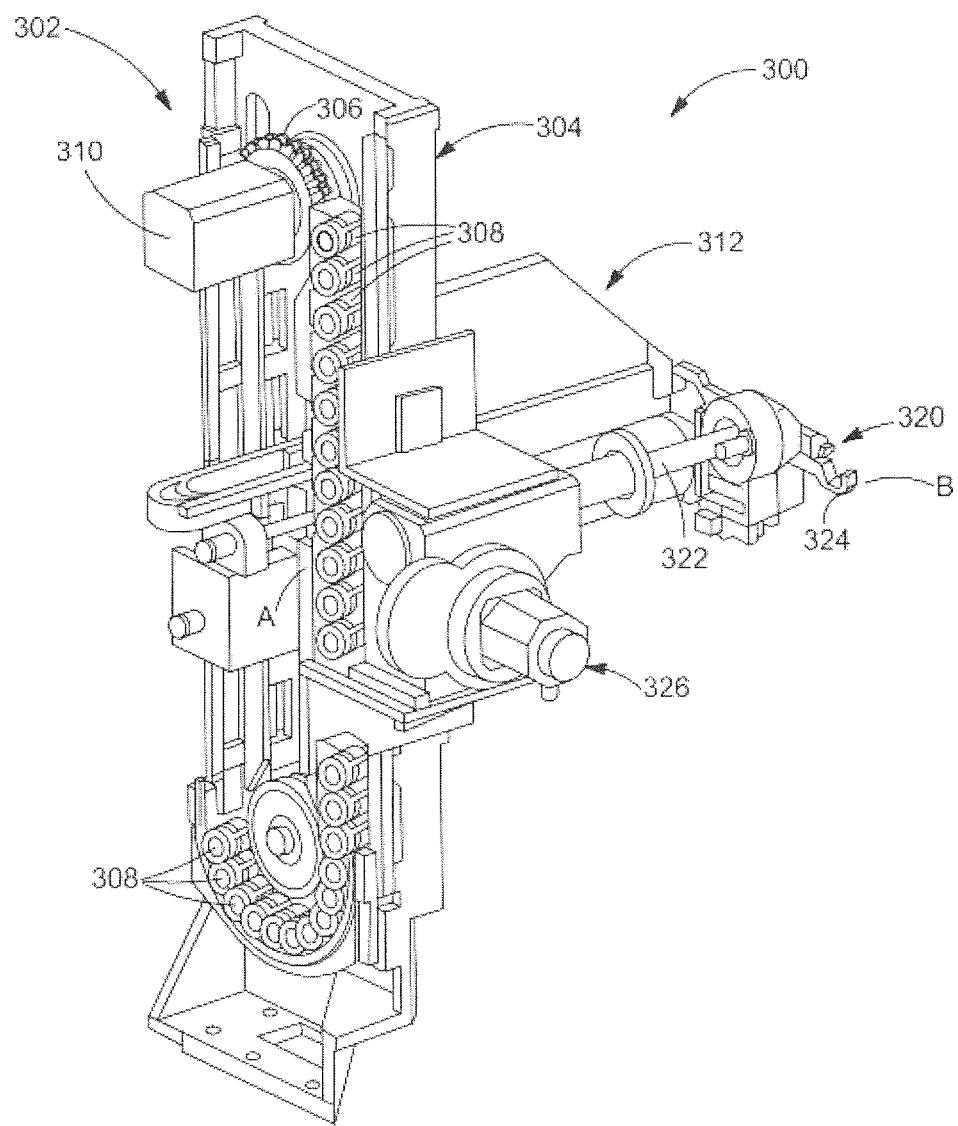
FIG. 11 is a perspective view of an exemplary tool changer of the machine of FIG. 1.

The computer numerically controlled machine 100 is illustrated in FIG. 10 with the safety doors open. As shown, the computer numerically controlled machine 100 may be provided with at least a tool retainer 106 disposed on a spindle 144, a turret 108, one or more chucks or workpiece retainers 110, 112 as well as a user interface 114 configured to interface with a computer control system of the computer numerically controlled machine 100. Each of the tool retainer 106, spindle 144, turret 108 and workpiece retainers 110, 112 may be disposed within a machining area 190 and selectively rotatable and/or movable relative to one another along one or more of a variety of axes.

As indicated in FIG. 10, for example, the X, Y, and Z axes may indicate orthogonal directions of movement, while the A, B, and C axes may indicate rotational directions about the X, Y, and Z axes, respectively. These axes are provided to help describe movement in a three-dimensional space, and therefore, other coordinate schemes may be used without departing from the scope of the appended claims. Additionally, use of these axes to describe movement is intended to encompass actual, physical axes that are perpendicular to one another, as well as virtual axes that may not be physically perpendicular but in which the tool path is manipulated by a controller to behave as if they were physically perpendicular.

With reference to the axes shown in FIG. 10, the tool retainer 106 may be rotated about a B-axis of the spindle 144 upon which it is supported, while the spindle 144 itself may be movable along an X-axis, a Y-axis and a Z-axis. The turret 108 may be movable along an XA-axis substantially parallel to the X-axis and a ZA-axis substantially parallel to the Z axis. The workpiece retainers 110, 112 may be rotatable about a C-axis, and further, independently translatable along one or more axes relative to the machining area 190. While the computer numerically controlled machine 100 is shown as a six-axis machine, it is understood that the number of axes of movement is merely exemplary, as the machine may be capable of movement in less than or greater than six axes without departing from the scope of the claims.

Figure 13:
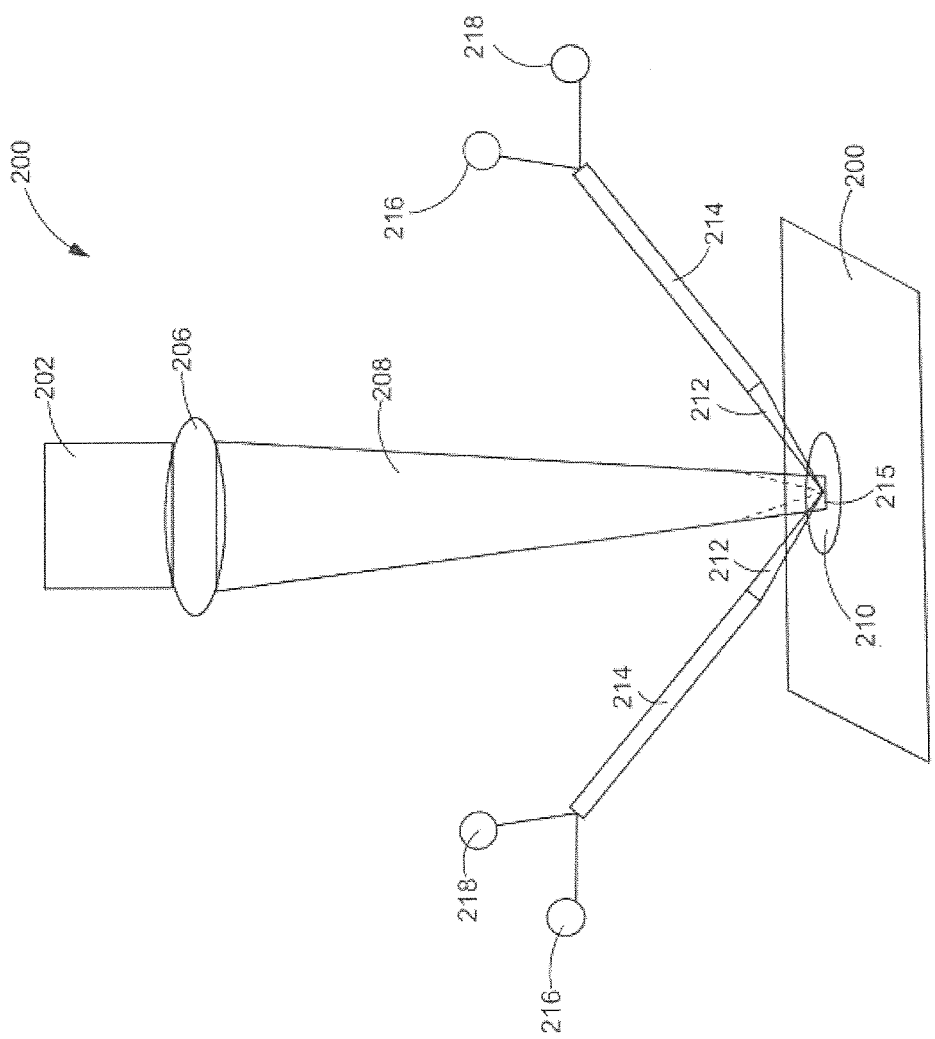
FIG. 13 is a schematic illustration of a material deposition assembly for use with the computer numerically controlled machine of FIG. 1.

The computer numerically controlled machine 100 may include a material deposition assembly for performing additive manufacturing processes. An exemplary material deposition assembly 200 is schematically illustrated in FIG. 13 as including a fabrication energy beam 202 capable of being directed toward a substrate 204. The substrate 204 may be supported by one or more of the workpiece retainers, such as chucks 110, 112. The material deposition assembly 200 may further include an optic 206 that may direct a concentrated energy beam 208 toward the substrate 204, however the optic 206 may be omitted if the concentrated energy beam 208 has sufficiently large energy density. The fabrication energy beam 202 may be a laser beam, an electron beam, an ion beam, a cluster beam, a neutral particle beam, a plasma jet, or a simple electrical discharge (arc). The concentrated energy beam 208 may have an energy density sufficient to melt a small portion of the growth surface substrate 204, thereby forming a melt-pool 210, without losing substrate material due to evaporation, splattering, erosion, shock-wave interactions, or other dynamic effects. The concentrated energy beam 208 may be continuous or intermittently pulsed.

The melt-pool 210 may include liquefied material from the substrate 204 as well as added feed material. Feed material may be provided as a feed powder that is directed onto the melt-pool 210 in a feed powder/propellant gas mixture 212 exiting one or more nozzles 214. The nozzles 214 may fluidly communicate with a feed powder reservoir 216 and a propellant gas reservoir 218. The nozzles 214 create a flow pattern of feed powder/propellant gas mixture 212 that may substantially converge into an apex 215 or region of smallest physical cross-section so that the feed powder is incorporated into the melt-pool 210. As the material deposition assembly 200 is moved relative to the substrate 204, the assembly traverses a tool path that forms a bead layer on the substrate 204. Additional bead layers may be formed adjacent to or on top of the initial bead layer to fabricate solid, three-dimensional objects.

Depending on the materials used and the object tolerances required, it is often possible to form net shape objects, or objects which do not require further machining for their intended application (polishing and the like are permitted). Should the required tolerances be more precise than are obtainable by the material deposition assembly 200, a subtractive finishing process may be used. When additional finishing machining is needed, the object generated by the material deposition assembly 200 prior to such finishing is referred to herein as "near-net shape" to indicate that little material or machining is needed to complete the fabrication process.

Figure 14:
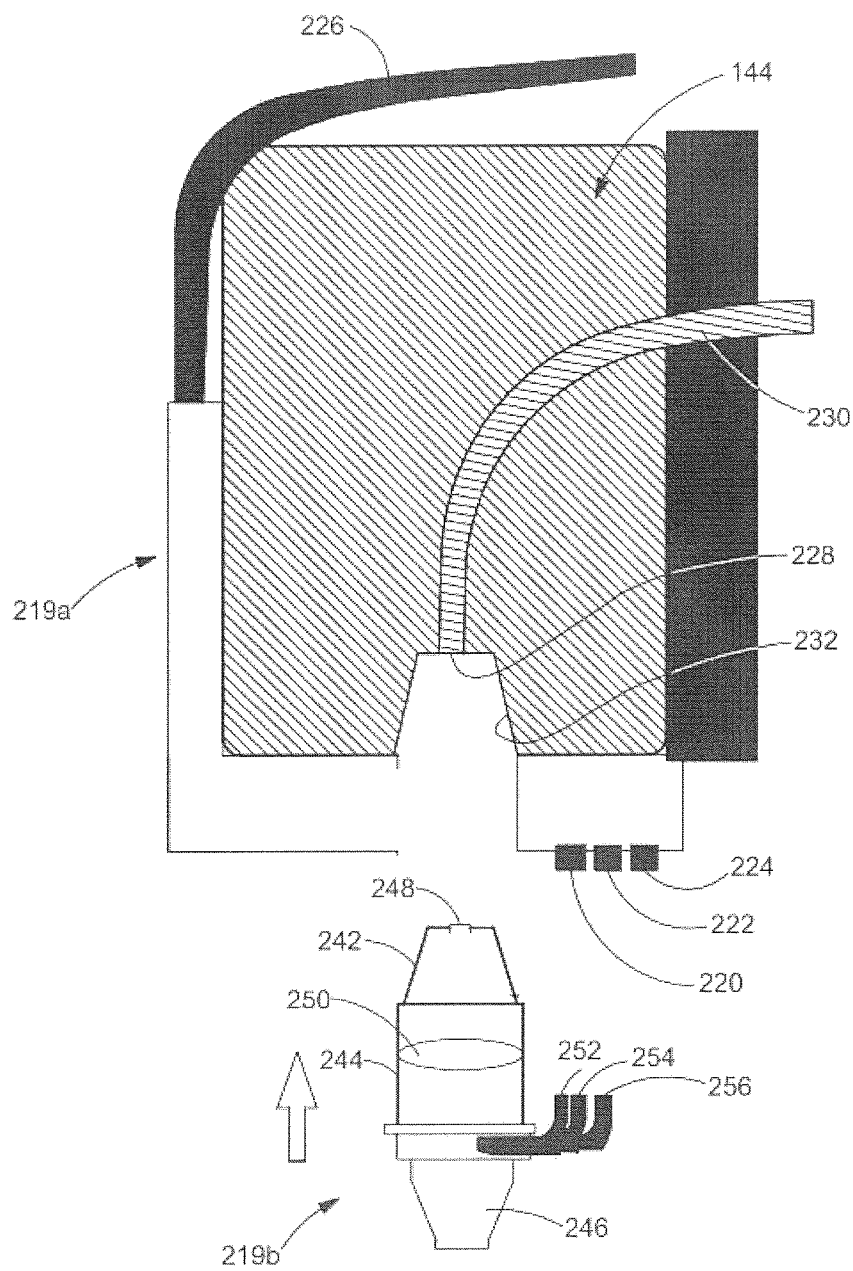
FIG. 14 is a side elevation view of a material deposition assembly having a removable deposition head.

The material deposition assembly 200 may be incorporated into the computer numerically controlled machine 100, as best shown in FIG. 14. In this exemplary embodiment, the material deposition assembly 200 includes a processing head assembly 219 having an upper processing head 219a and a lower processing head 219b. The lower processing head 219b is detachably coupled to the upper processing head 219a to permit the upper processing head 219a to be used with different lower processing heads 219b. The ability to change the lower processing head 219b may be advantageous when different deposition characteristics are desired, such as when different shapes and/or densities of the fabrication energy beam 202 and/or feed powder/propellant gas mixture 212 are needed.

More specifically, the upper processing head 219a may include the spindle 144. A plurality of ports may be coupled to the spindle 144 and are configured to interface with the lower processing head 219b when connected. For example, the spindle 144 may carry a feed powder/propellant port 220 fluidly communicating with a powder feed supply (not shown), which may include a feed powder reservoir and a propellant reservoir. Additionally, the spindle 144 may carry a shield gas port 222 fluidly communicating with a shield gas supply (not shown), and a coolant port 224 fluidly communicating with a coolant supply (not shown). The feed powder/propellant port 220, shield gas port 222, and coolant port 224 may be connected to their respective supplies either individually or through a harnessed set of conduits, such as conduit assembly 226.

The upper processing head 219a further may include a fabrication energy port 228 operatively coupled to a fabrication energy supply (not shown). In the illustrated embodiment, the fabrication energy supply is a laser connected to the fabrication energy port 228 by laser fiber 230 extending through a housing of the spindle 144. The laser fiber 230 may travel through a body of the spindle 144, in which case the fabrication energy port 228 may be located in a socket 232 formed in a bottom of the spindle 144. Therefore, in the embodiment of FIG. 14, the fabrication energy port 228 is disposed inside the socket 232 while the feed powder/propellant port 220, shield gas port 222, and coolant port 224 are disposed adjacent the socket 232. The upper processing head 219a may further include additional optics for shaping the energy beam, such as a collimation lens, a partially reflective mirror, or a curved mirror.

The upper processing head 219a may be selectively coupled to one of a plurality of lower processing heads 219b. As shown in FIG. 14, an exemplary lower processing head 219b may generally include a base 242, an optic chamber 244, and a nozzle 246. Additionally, a nozzle adjustment assembly may be provided to translate, rotate, or otherwise adjust the position and/or orientation of the nozzle 246 relative to the energy beam. The base 242 is configured to closely fit inside the socket 232 to permit releasable engagement between the lower processing head 219b and the upper processing head 219a. In the embodiment of FIG. 14, the base 242 also includes a fabrication energy interface 248 configured to detachably couple to the fabrication energy port 228. The optic chamber 244 may be either empty or it may include a final optic device, such as a focusing optic 250 configured to provide the desired concentrated energy beam. The lower processing head 219b may further include a feed powder/propellant interface 252, a shield gas interface 254, and a coolant interface 256 configured to operatively couple with the feed powder/propellant port 220, shield gas port 222, and coolant port 224, respectively.

The nozzle 246 may be configured to direct feed powder/propellant toward the desired target area. In the embodiment illustrated at FIG. 16, the nozzle 246 includes an outer nozzle wall 270 spaced from an inner nozzle wall 272 to define a powder/propellant chamber 274 in the space between the outer and inner nozzle walls 270, 272. The powder/propellant chamber 274 fluidly communicates with the feed powder/propellant interface 252 at one end and terminates at an opposite end in a nozzle exit orifice 276. In the exemplary embodiment, the nozzle exit orifice 276 has an annular shape; however other the nozzle exit orifice 276 may have other shapes without departing from the scope of the present disclosure. The powder/propellant chamber 274 and nozzle exit orifice 276 may be configured to provide one or more jets of feed powder/propellant at the desired angle of convergence. The nozzle 246 of the illustrated embodiment may deliver a single, conical-shaped jet of powder/propellant gas. It will be appreciated, however, that the nozzle exit orifice 276 may be configured to provide multiple discrete jets of powder/propellant gas. Still further, the resulting jet(s) of powder/propellant gas may have shapes other than conical.

Figure 16:
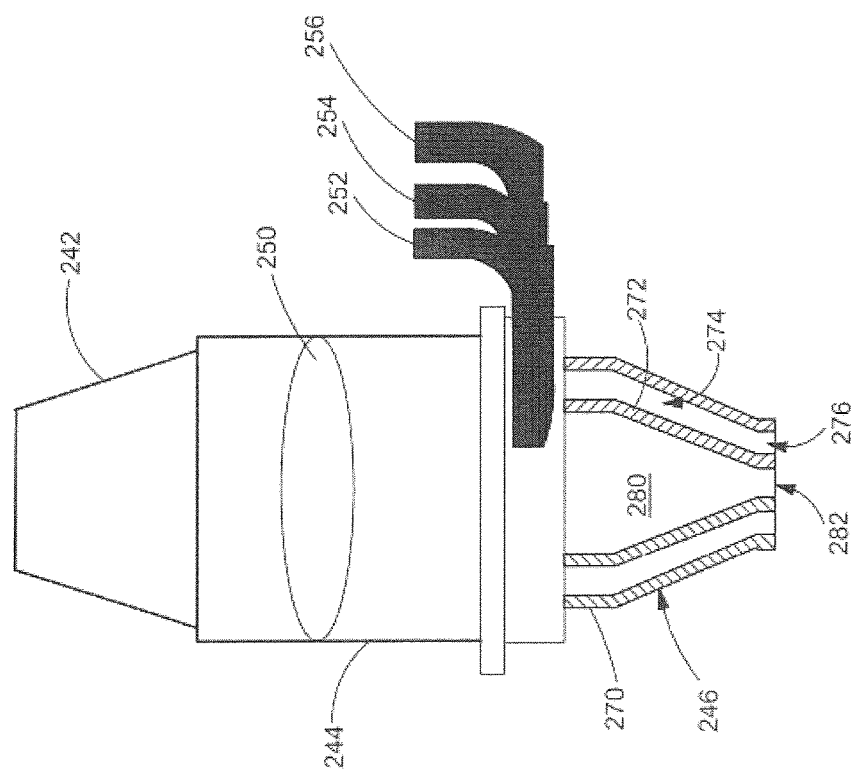
FIG. 16 is a side elevation view, in partial cross-section, of a lower processing head used in the material deposition assembly of FIG. 14.

The nozzle 246 may further be configured to permit the fabrication energy beam to pass through the nozzle 246 as it travels toward the target area. As best shown in FIG. 16, the inner nozzle wall 272 defines a central chamber 280 having a fabrication energy outlet 282 aligned with the optic chamber 244 and the optional focusing optic 250. Accordingly, the nozzle 246 permits the beam of fabrication energy to pass through the nozzle 246 to exit the lower processing head 219b.

Figure 15:
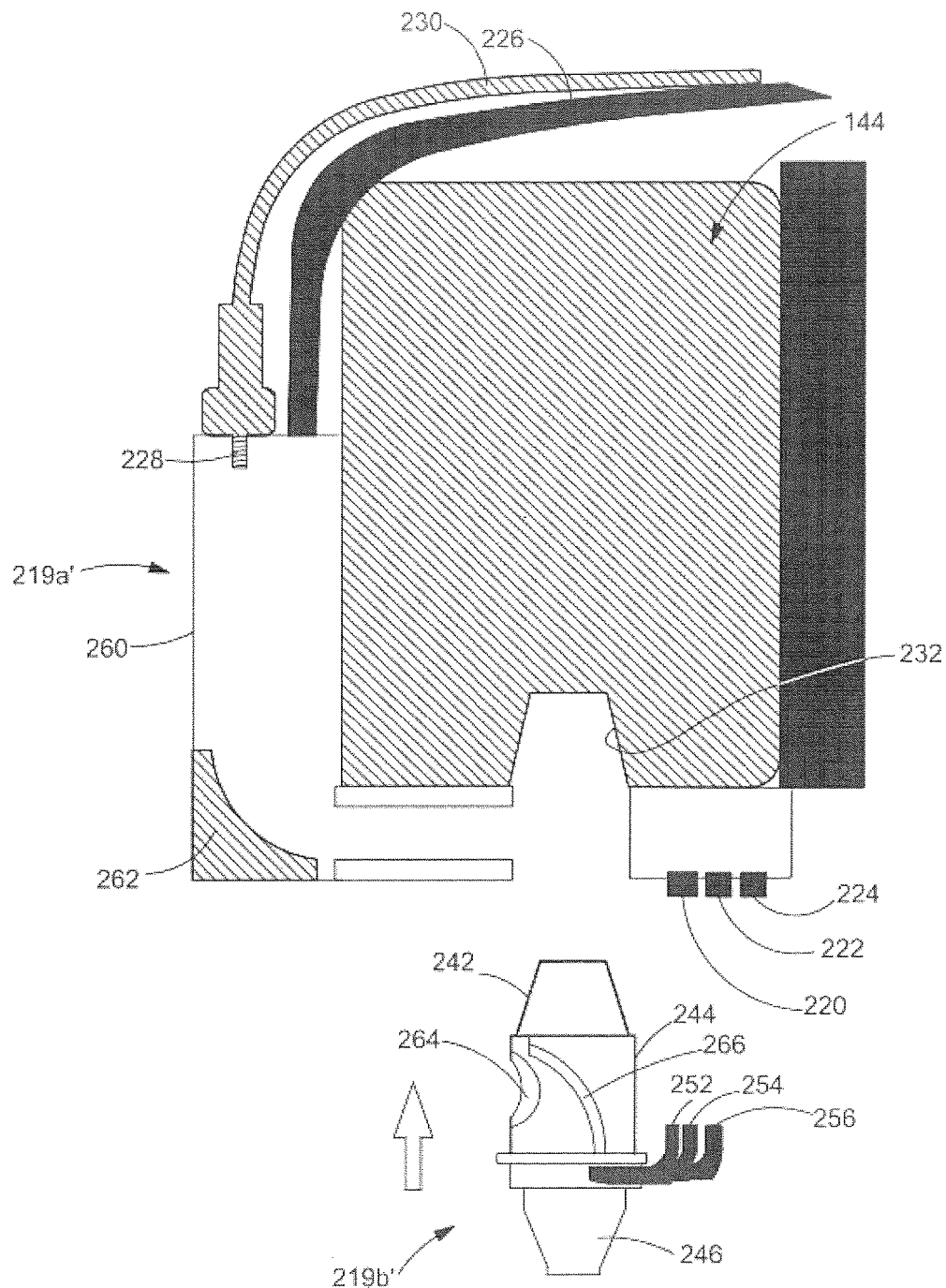
FIG. 15 is a side elevation view of an alternative embodiment of a material deposition assembly having a removable deposition head.

In an alternative embodiment, an upper processing head 219a' may have the fabrication energy port 228 provided outside of the housing of the spindle 144 as best shown in FIG. 15. In this embodiment, the fabrication energy port 228 is located on an enclosure 260 provided on a side of the spindle 144, and therefore, unlike the above embodiment, this port is not provided in the socket 232. The enclosure 260 includes a first mirror 262 for directing the fabrication energy toward a point below the socket 232 of the spindle 144. An alternative lower processing head 219b' includes an optic chamber 244 that includes a fabrication energy receptacle 264 through which the fabrication energy may pass from the enclosure 260 to an interior of the optic chamber 244. The optic chamber 244 further includes a second mirror 266 for redirecting the fabrication energy through the nozzle 246 and toward the desired target location.

While the exemplary embodiments incorporate the fabrication energy into the processing head assembly 219, it will be appreciated that the fabrication energy may be provided independent of the processing head assembly 219. That is, a separate assembly, such as the turret 108, the first chuck 110, the second chuck 112, or a dedicated robot provided with the machine 100, may be used to direct the fabrication energy toward the substrate 204. In this alternative embodiment, the processing head assembly 219 would omit the fabrication energy port, fabrication energy interface, fabrication energy outlet, optic chamber, and focusing optic.

With the processing head assembly 219 having the upper processing head 219a configured to selectively couple with any one of several lower processing heads 219b, the computer numerically controlled machine 100 may be quickly and easily reconfigured for different additive manufacturing techniques. The tool magazine 142 may hold a set of lower processing heads 219b, wherein each lower processing head in the set has unique specifications suited for a particular additive manufacturing process. For example, the lower processing heads may have different types of optics, interfaces, and nozzle angles that alter the manner in which material is deposited on the substrate. When a particular part must be formed using different additive manufacturing techniques (or may be formed more quickly and efficiently when multiple different techniques are used), the tool changer 143 may be used to quickly and easily change the particular deposition head coupled to the spindle 144. In the exemplary embodiments illustrated in FIGS. 14 and 15, a single attachment step may be used to connect the energy, feed powder/propellant gas, shield gas, and coolant supplies to the deposition head. Similarly, detachment is accomplished in a single disconnect step. Accordingly, the machine 100 may be more quickly and easily modified for different material deposition techniques.

Figure 17:
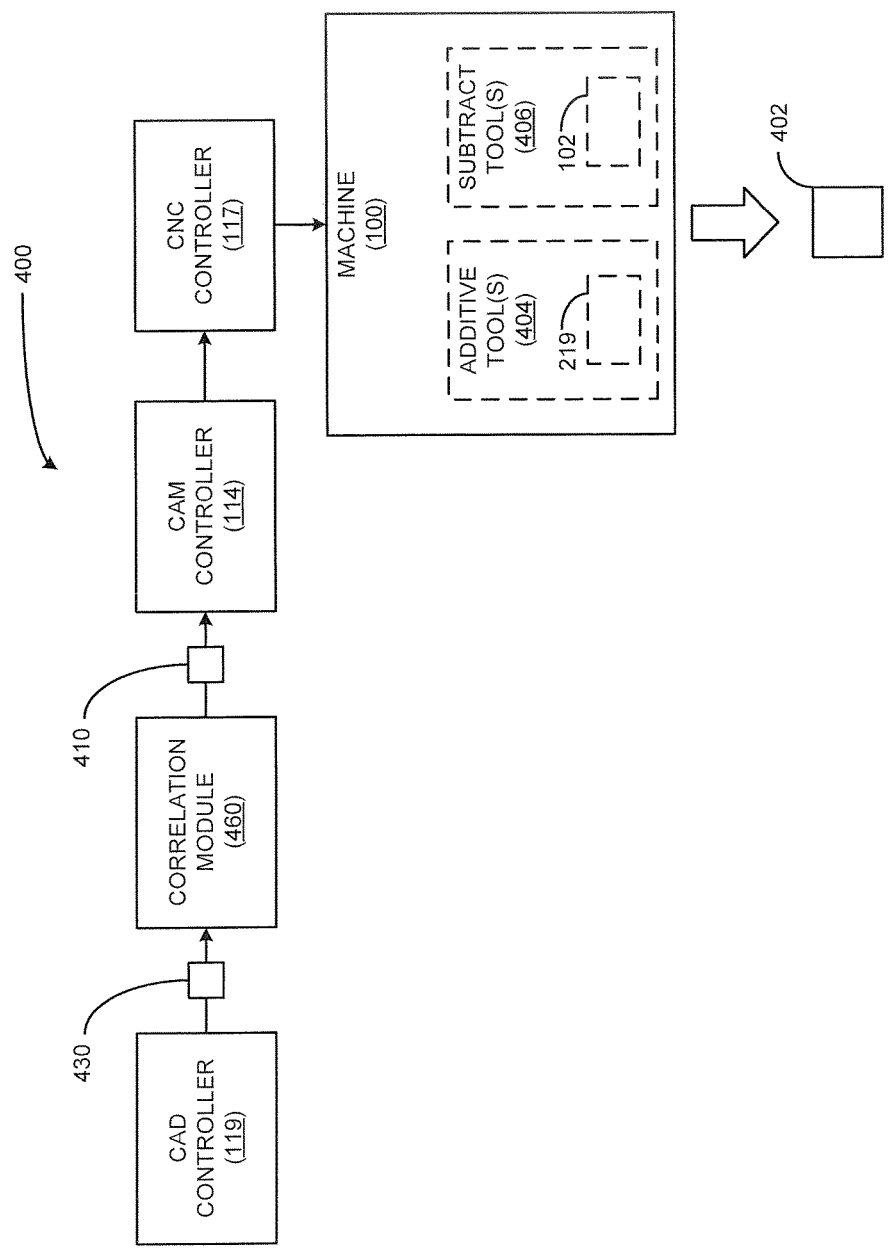
FIG. 17 is a schematic representation of a system for manufacturing a part using a hybrid machine, in accordance with an embodiment of the disclosure.

Turning now to FIG. 17, a system 400 for utilizing the machine 100 to manufacture a part 402 (e.g., a work piece) is shown in a schematic representation. The machine, as depicted in FIG. 17 and in conjunction with FIGS. 1-16, includes additive manufacturing tool(s) 404 and subtractive manufacturing tool(s) 406. In some examples, the part 402 may be a pre-cast work piece that is modified using the machine 100. Alternatively, the part 402 may be formed with the additive manufacturing tool(s) 404 and optionally modified with the subtractive manufacturing tool(s) 406. Additive manufacturing tool(s) 404 include one or more tools suitable for performing additive manufacturing to manufacture a portion, or all, of the part 402, such as, but not limited to, the processing head assembly 219, as described above. Further, the subtractive manufacturing tool(s) 406 include one or more tools suitable for performing subtractive manufacturing operations to manufacture the part 402, such as, but not limited to the tool 102. As described above, the tool 102 may be a cutting tool such as a milling tool, a drilling tool, a grinding tool, a blade tool, a broaching tool, a turning tool, or any other type of cutting tool deemed appropriate and in connection with the computer numerically controlled machine 100.

The machine 100 receives instructions for guiding the additive and subtractive manufacturing tool(s) 404, 406 from the CNC controller 117. The CNC controller is configured to control the additive and subtractive manufacturing tool(s) based on, at least, CAM instructions 410 provided to the CNC controller 117 by the CAM controller 114. As discussed above, the CNC controller 117 and CAM controller 114 may both be implemented by the same computer or they may be implemented by multiple computers acting in operative association.

The CAM instructions 410 may include instructions which are executed by using a series of CAM operation control functions 411. As shown best in FIG. 18, the CAM operation control functions 411 may include, but are not limited to including, a deposition function 412, a milling function 418, a turning function 419, an additive chamfer function 420, a subtractive chamfer function 422, an additive fillet function 424, a subtractive fillet function 426, and a binary deposition function 428. Further, the CAM instructions 410 may include a part build plan 429, which can be implemented to guide tool paths of the additive and subtractive manufacturing tool(s) 404, 406 when manufacturing the part (e.g., layer-wise iterations of the processing head assembly).

In generating the CAM instructions 410, the CAM controller 114 may determine the CAM instructions 410 based, at least in part, on CAD instructions 430 provided to the CAM controller 114 by a CAD controller 119. The CAD controller 119 may be implemented by a computer, in similar fashion to the CAM controller 114 and/or the CNC controller 117. While the CAD controller 119 and CAM controller 114 are depicted as separate elements, it is certainly possible that the CAD controller 119 and CAM controller 114 may be implemented using a single controller or computer.

The CAD instructions 430 may include a plurality of CAD operation control functions 431. The CAD operation control functions 431 may include, but are not limited to including, an extrude function 432, a revolve function 434, a sweep function 436, a cut function 438, a chamfer function 440, a fillet function 444, and a selective sweep function 448. Additionally, the CAD instructions 430 may include a process plan 450, which is used to determine an order of processes or instructions which can utilize the CAD operation control functions 431 in providing instructions for the CAM instructions 410. The process plan 450 may include patterns for layer deposition and/or the process plan 450 may include conditions for layer deposition. In some examples, the CAD instructions 430 may be designed based on or otherwise constrained by material guidelines 456. The material guidelines 456 may be input or may be stored information associated with materials used to manufacture the part 402 by the machine 100.

Each of the CAM operation control functions 411 is correlated with at least one of the plurality of CAD operation control functions 431. By having the CAM operation control functions 411 correlated with the plurality of CAD operation control functions 431, a CAD model can be designed wherein sequences of operations used to form a CAD model may be transferred over to the CAM environment to order the sequence of steps used in the hybrid manufacturing process of the machine 100. As a result, the hybrid manufacturing process plan of the CAM instructions 410 will be very similar to that of the sequences of the CAD instructions 430 within the CAD environment. Such CAD instructions 430, including information as to how the model was created and which may influence the CAM instructions 410, may be considered a "smart" CAD model, based on the CAD instructions 430.

Figure 18:
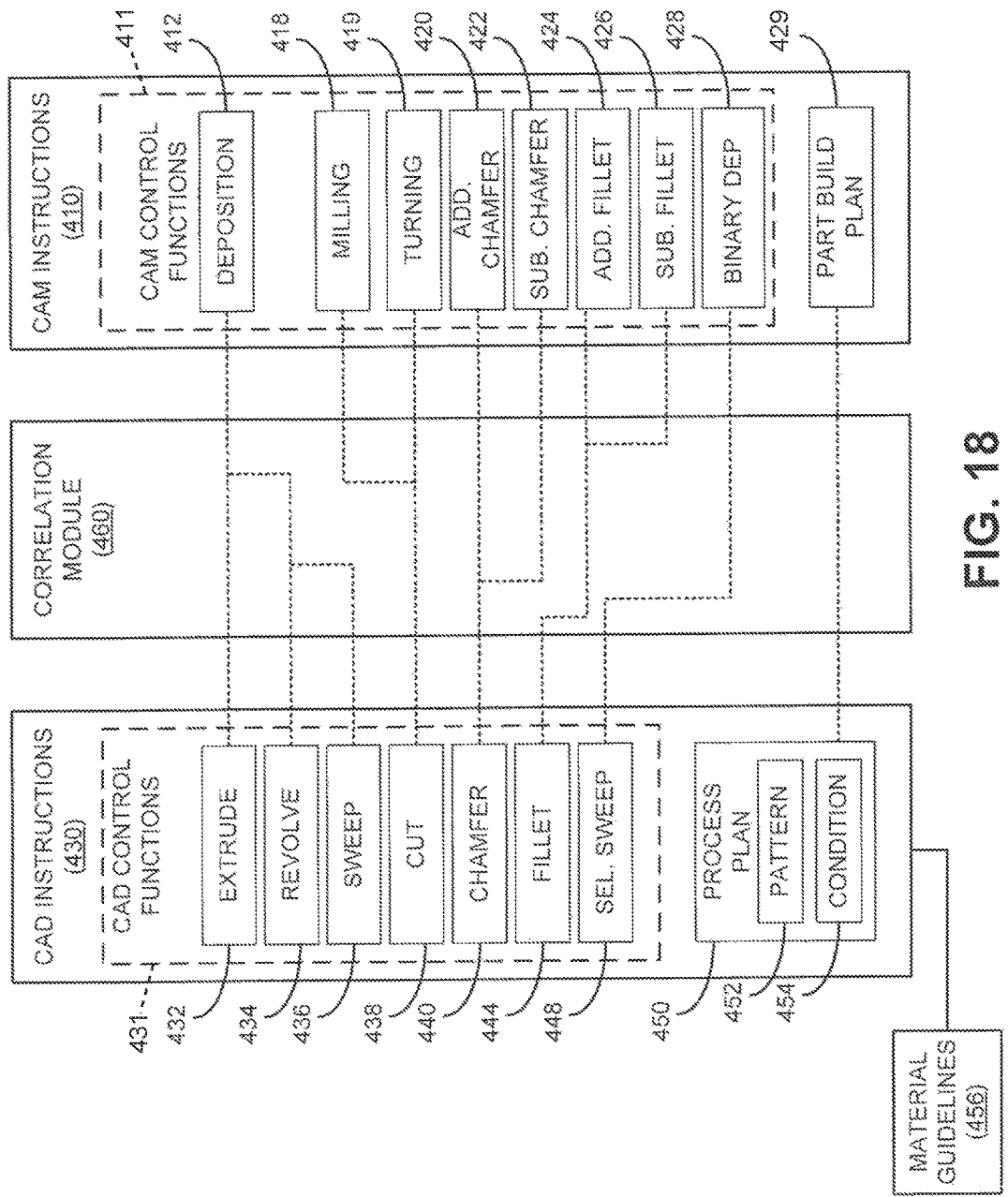
FIG. 18 is a schematic representation of CAD instructions and CAM instructions and the correlation between respective CAD operation functions and CAM operation functions of the CAD instructions and CAM functions, for use with the system of FIG. 17.

As shown in FIG. 18, the CAM operation control functions 411 may have specific correlations to one or more of the CAD operation control functions 431, and vice versa. As shown, the deposition function 412 may be correlated with one or all of the extrude function, the revolve function 434, and the sweep function 436 of the CAD operation control functions 431. The deposition function 412 may be any additive manufacturing function causing the additive manufacturing tool(s) 404 to deposit materials (e.g., grow, build, or add functions).

The CAM operation control functions 411 and CAD operation control functions 431 further correlate subtractive functions as well. For example, a cut function 438 of the CAD operation control functions 431 may be correlated with one or both of the milling function 418 and the turning function 419 of the CAM operation control functions 431. The milling function 418 may direct the subtractive manufacturing tool(s) 406 to remove materials from the part 402 during manufacture. The turning function 419 may direct a tool of the subtractive manufacturing tool(s) 406 which turns the part 402 (e.g., a lathe) while a stationary tool of the subtractive manufacturing tool(s) 406 removes materials from the part 402 as it turns. Additionally, the cut function 438 (e.g., a "cutout" function in a CAD environment) may be implemented by and correlated with any other removal or subtractive machining operation command.

Figure 19:
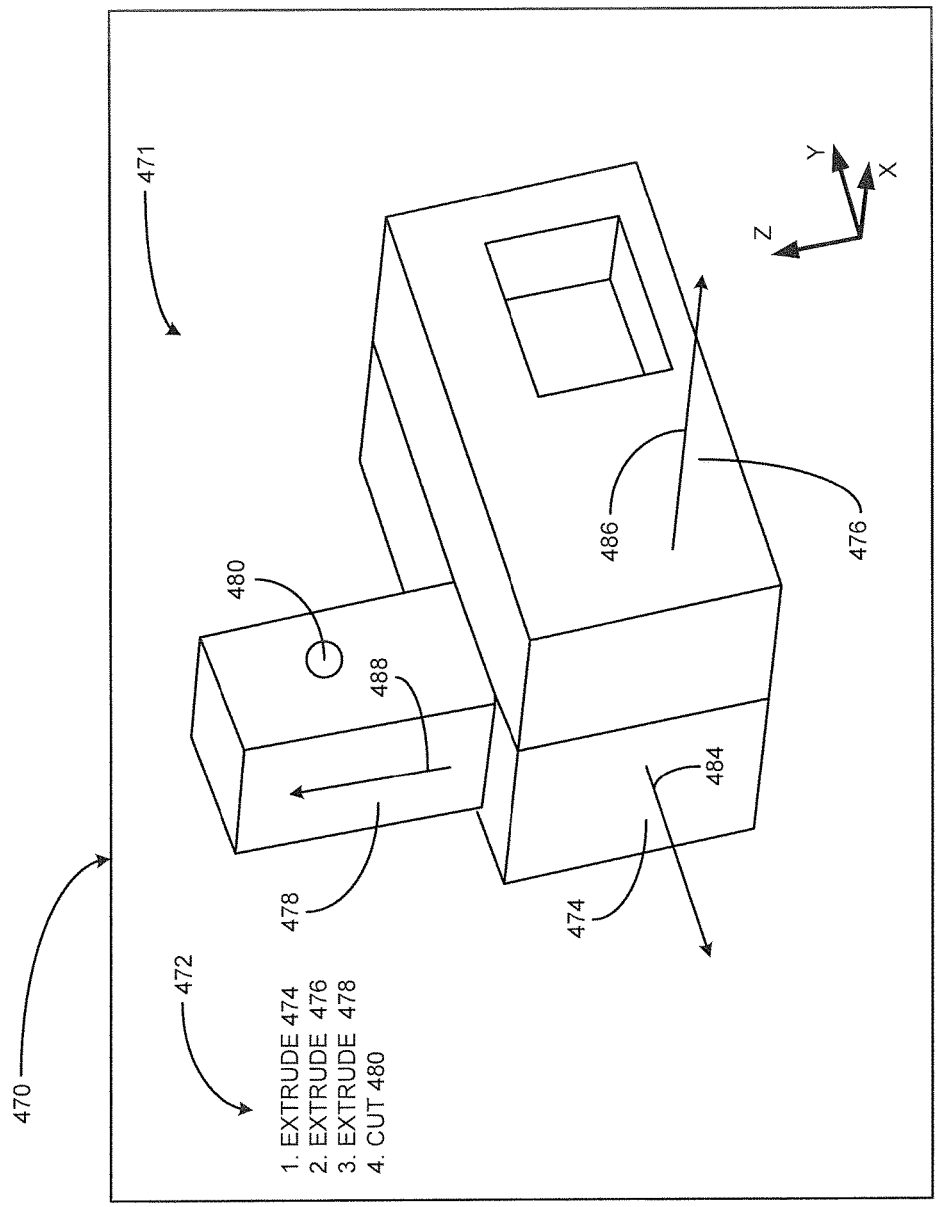
FIG. 19 is an example CAD work environment, in conjunction with the system of FIG. 17.

An example of a CAD environment 470 utilizing a smart model 471 for manufacturing the part 402 is shown in FIG. 19. The smart model 471 may include an ordered list of instructions 472 for performing the hybrid machining of the part 402, which may be implemented as part of the CAD instructions 430. The ordered list of instructions 472 may begin by extruding a first protrusion 474, then may continue to extrude a second protrusion 476, extrude a third protrusion 478, and, lastly, cut a hole 480 in the third protrusion 478. This order and the specific instructions for extruding and cutting may be part of the CAD instructions 430, which then can be converted into readable, correlated instructions for the CAM instructions 410 to, in a similar order, additive manufacture the first protrusion 474, additive manufacture the second protrusion 476, additive manufacture the third protrusion 478, and, lastly, subtractive manufacture the hole 480. The CAM instructions 410 may then be used by the CNC controller 117 and used to control the additive and subtractive manufacturing tool(s) 404, 406 to manufacture the part 402 based on the smart model 471. As shown, the first, second, and third protrusions 474, 476, 478 are deposited in first, second, and third deposition directions 484, 486, 488, as represented by arrows. Such directions of deposition may be included in the CAD instructions 430 as, for example, part of the pattern of layer deposition 452 and/or the conditions of deposition 454 of the process plan 450. Conditions of deposition may include, but are not limited to, layer height and/or feed speeds.

Figure 20A:
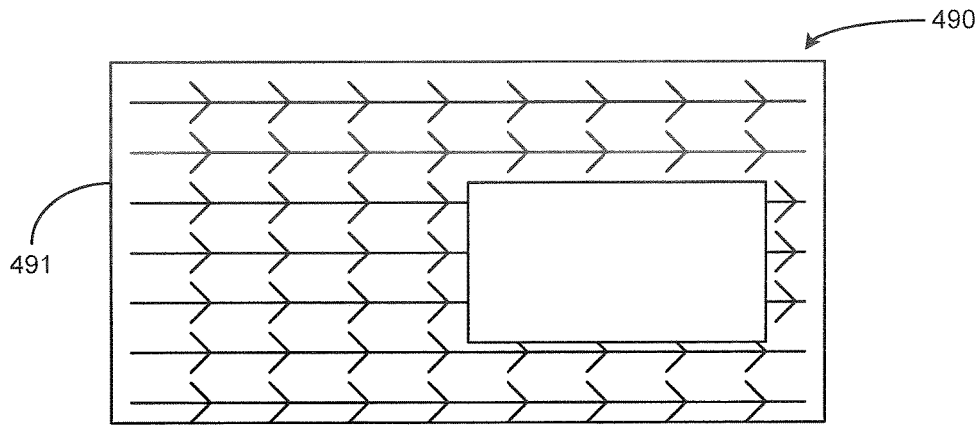
FIG. 20(A) is an example deposition plan for a layer of a part, in conjunction with instructions of the embodiments of FIGS. 17 and 18.
Figure 20B:
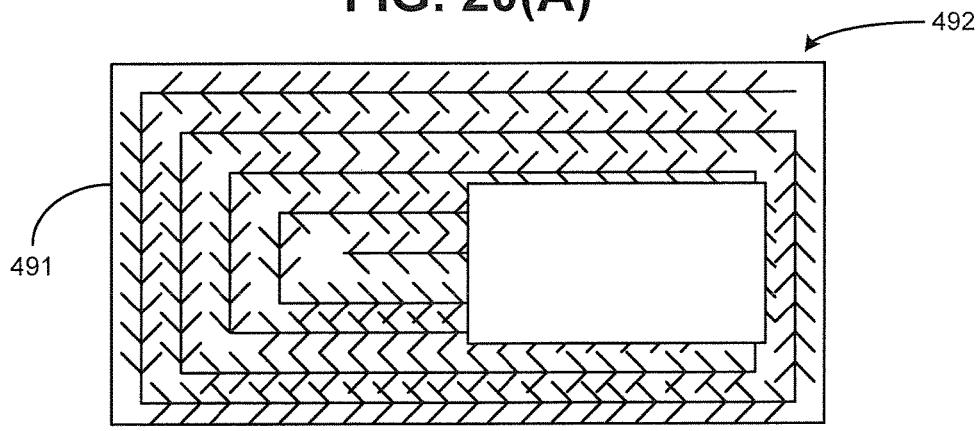
FIG. 20(B) is another example deposition plan for a layer of a part, in conjunction with instructions of the embodiments of FIGS. 17 and 18.
Figure 20C:
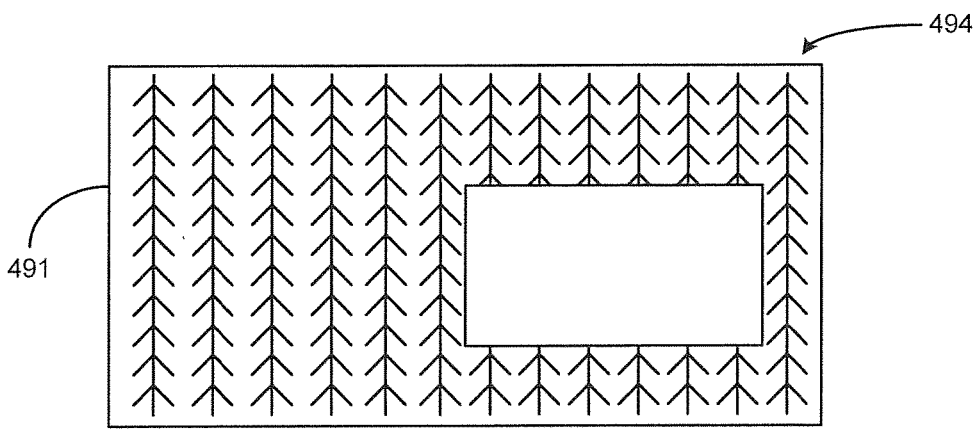
FIG. 20(C) is yet another example deposition plan for a layer of a part, in conjunction with instructions of the embodiments of FIGS. 17 and 18.

As shown in FIGS. 20(A)-(C), the pattern of layer deposition 452 may include specific instructions for the method of pattern deposition to be performed by the additive manufacturing tool(s) 404. Beginning with FIG. 20(A), a first layer deposition plan 490, for potential use in the pattern of layer deposition 452 for a layer 491 of the third protrusion 478, is shown. The first layer deposition plan 490 may include path instructions, denoted by arrows, for the additive manufacturing tool(s) 404 to follow when depositing materials for the layer 491. The path instructions may be in any direction, such as the horizontal path instructions shown in FIG. 20(A). An alternative example of a second deposition plan 492 for use in the pattern of layer deposition 452 for the layer 491 of the third protrusion 478 is shown in FIG. 20(B). The second deposition plan 492, as shown, may alternate between horizontal path instructions and vertical path instructions, as shown by arrows. Further still, another example of a third deposition plan 494 for use in the pattern of layer deposition 452 for the layer 491 of the third protrusion 478 is shown in FIG. 20(C). In the third deposition plan 494, vertical path instructions are denoted by arrows. However, the example deposition plans 490, 492, 494 are merely exemplary and the pattern of layer deposition 452 may include instructions for depositing materials in any suitable pattern.

As mentioned above with reference to FIG. 18, the CAM operation control functions 411 and CAD operation control functions 431 may include additional, correlated functions. For example, fillet and chamfer operations may need to involve both additive and subtractive manufacturing techniques when applied to actual, physical manipulation of the part 402. Therefore, as shown, the chamfer function 440 of the CAD operation control functions 431 may be correlated with the additive chamfer function 420 and subtractive chamfer function 422 of the CAM operation control functions 411.

Similarly, a fillet function of the CAD operation control functions 431 may be correlated with the additive fillet function 424 and the subtractive fillet function 426. Generally, in a CAD environment, a fillet is usually included as a single operation. For example, a CAD designer could draw a radius at an intersection of two intersecting lines. Then, such two-dimensional geometry is revolved around an axis to create a three-dimensional model, by, for example, using a sweep function. As shown above, a sweep function correlates to a deposition function. However, in the CAM environment, fillets may be more efficiently built by first using the additive fillet function 424 to build the fillet, and then subtractively remove materials using the subtractive fillet function 426 to manufacture the desired fillet.

Further still, the selective sweep function 448 of the CAD operation control functions 431 may be correlated with the binary deposition function 428 of the CAM operation control function. In the selective sweep function 448, materials may be selectively deposited for the part 402 over an area for deposition. For example, selective sweep function 448 may be useful in designing a surface having a hole within a deposition area. Selective sweep function 448 correlates to the binary deposition function 428, as the binary deposition function 428 will deposit materials over an area in an "ON/OFF" manner as the additive manufacturing tool(s) 404 travel over the area for deposition.

Such correlations, as shown, may be implemented using the correlation module 460. The correlation module 460 may be a software module having instructions to correlate the CAM operation control functions 411 with the CAD operation control functions 431 to intelligently apply the smart model. The correlation module 460 may be, for example, a software add-on or extension to CAD software executed by the CAD controller 119 to generate the CAD instructions 430. Alternatively, the correlation module 460 could be a software add-on or extension to the CAM software executed by the CAM controller 114 to translate the correlations of the respective operating functions prior to generating CAM instructions 410 based on the CAD instructions 430. In another alternative example, the correlation module could be executed by an additional controller which could process the CAD instructions 430 prior to their reception by the CAM controller 114.

Figure 21:
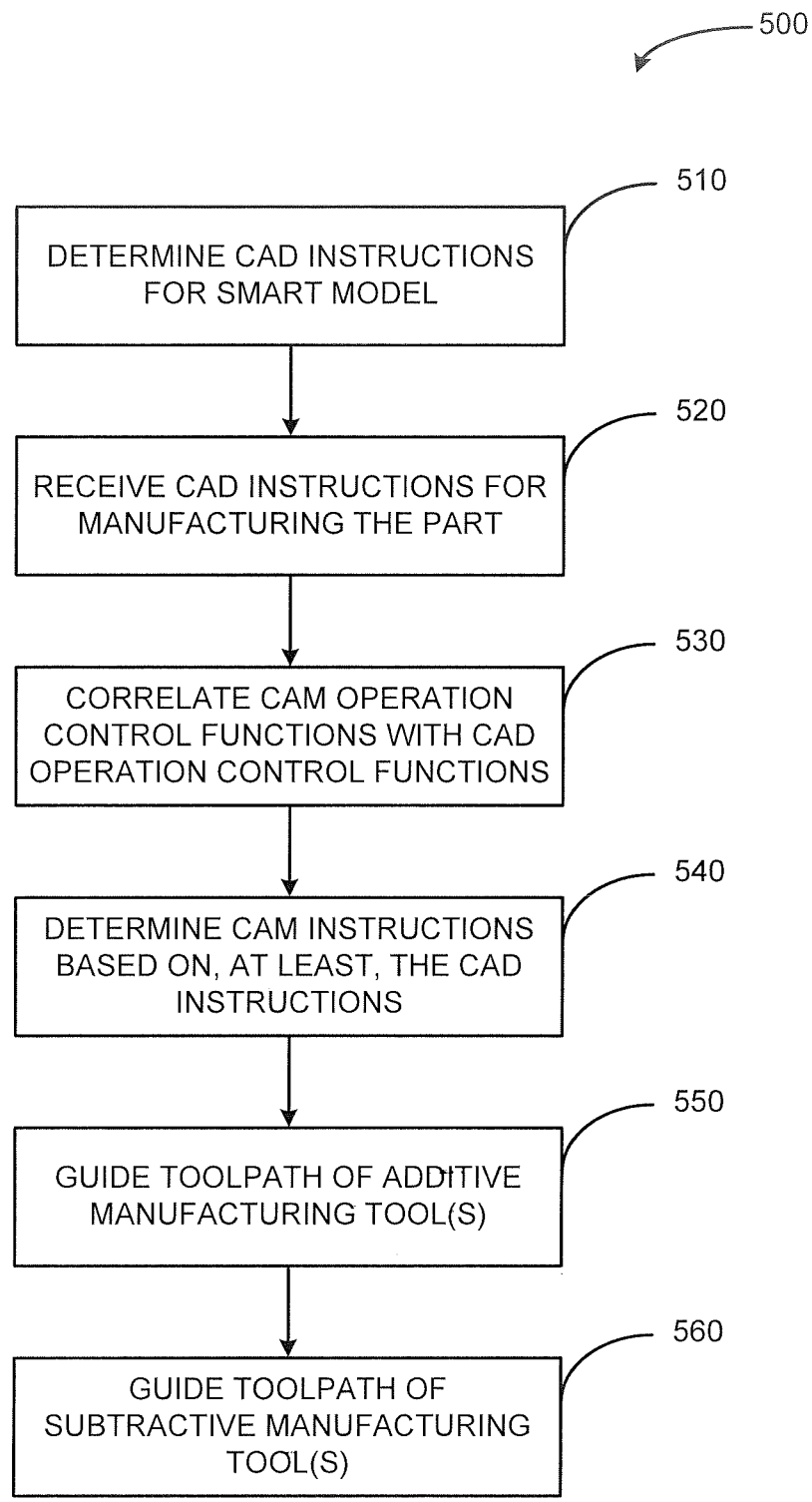
FIG. 21 is a flowchart representative of a method for manufacturing a part using a hybrid machine, in accordance with another embodiment of the disclosure.

Turning now to FIG. 21, a flowchart is illustrated, representing a method 500 for manufacturing the part 402 using the machine 100 in conjunction with the system 400 of FIGS. 17-18. The method 500 begins when the CAD instructions 430 are determined using, for example, the CAD controller 119 (block 510). The CAD instructions 430 are then received at, for example, the CAM controller 114, wherein the CAD instructions 430 includes the plurality of CAD operation control functions 431 (block 520). In some examples, the method 500 may include correlating the CAM operation control functions 411 with respective members of the CAD operation control functions 431 (block 530). The method continues by determining the CAM instructions 410 based on, at least, the CAD instructions 430, wherein each of the plurality of CAM operation control functions 411 is correlated with at least one of the plurality of CAD operation control functions 431 (block 540). The method may then guide a first toolpath of the additive manufacturing tool(s) 404 and/or may guide a second toolpath of the subtractive manufacturing tool(s) 406 (blocks 550, 560).

Figure 22:
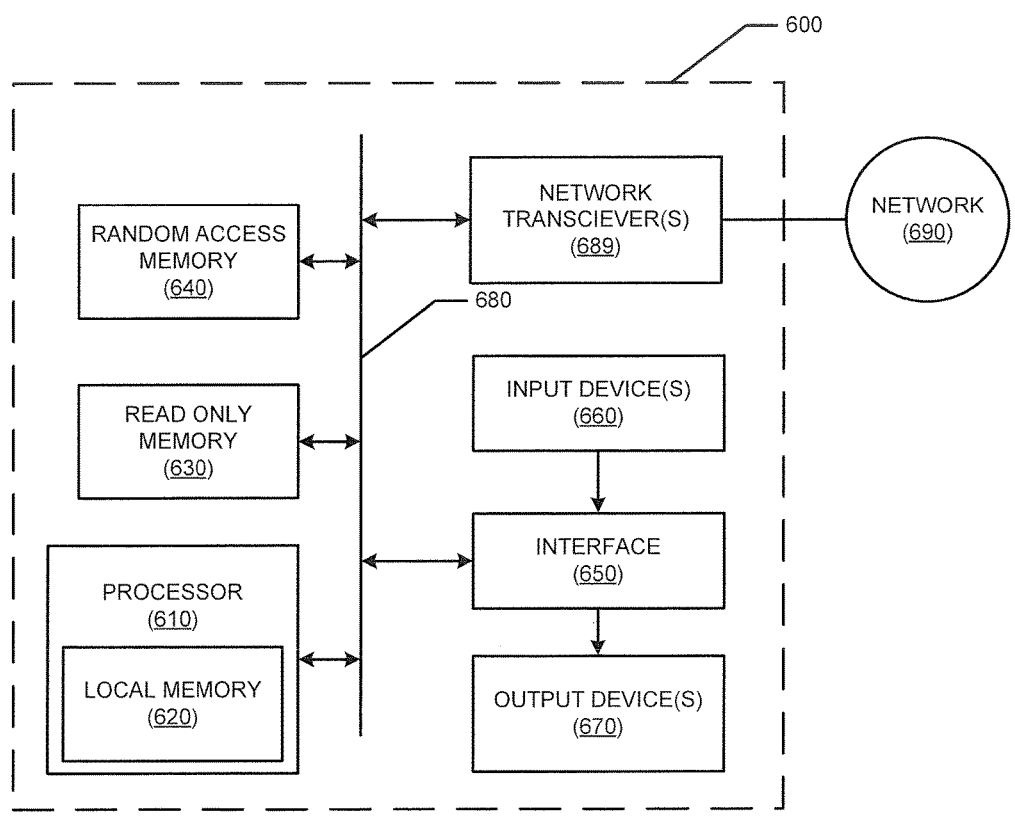
FIG. 22 is a block diagram of an example computer for implementing computers, controllers, and/or for executing instructions in conjunction with FIGS. 1, 3, 10, and 17-20.

Any of the CNC controller 117, the CAM controller 114, and the CAD controller 119 may be implemented by one or more computers associated with or in communication with the machine 100. Any of the CNC controller 117, the CAM controller 114, and the CAD controller 119 may be hardwired to the machine 100 or may, additionally or alternatively, transmit instructions to the machine 100 via a network. FIG. 22 is a block diagram of a computer 600 capable of executing instructions to direct the machine 100 to hybrid manufacture the part 402. The computer 600 may be, for example, a server, a personal computer, or any other type of computing device. The computer 600 of the instant example includes a processor 610. For example, the processor 610 may be implemented by one or more microprocessors or controllers from any desired family or manufacturer.

The processor 610 may include a local memory 620 and is in communication with a main memory including a read only memory 630 and a random access memory 640 via a bus 680. The random access memory 640 may be implemented by Synchronous Dynamic Random Access Memory (SDRAM), Dynamic Random Access Memory (DRAM), RAMBUS Dynamic Random Access Memory (RDRAM) and/or any other type of random access memory device. The read only memory 630 may be implemented by a hard drive, flash memory and/or any other desired type of memory device.

Further, the controller 16 may also include an interface circuit 650. The interface circuit 650 may be implemented by any type of interface standard, such as, for example, an Ethernet interface, a universal serial bus (USB), and/or a PCI express interface. One or more input devices 660 may be connected to the interface circuit 650. The input device(s) 660 permit a user to enter data and commands into the processor 610 (e.g., instructions for hybrid manufacturing). The input device(s) 660 can be implemented by, for example, a keyboard, a mouse, a touchscreen, a track-pad, a trackball, and/or a voice recognition system. One or more output devices 670 may also be connected to the interface circuit 650. The output devices 670 can be implemented by, for example, display devices for associated data (e.g., a liquid crystal display, a cathode ray tube display (CRT), etc.).

The computer 600 may include one or more network transceivers 689 for connecting to a network 690, such as the Internet, a WLAN, a LAN, a personal network, or any other network for connecting the computer 600 to the machine 100, one or more other controllers, and/or other network capable devices. As such, the computer 600 may be embodied by a plurality of computers 600 for providing instructions to the machine 100.

As mentioned above the computer 600 may be used to execute machine readable instructions. For example, the computer 600 may execute machine readable instructions to direct the machine 100 to hybrid manufacture the part 402. In such examples, the machine readable instructions comprise a program for execution by a processor such as the processor 610 shown in the example computer 600. The program may be embodied in software stored on a tangible computer readable medium. Such computer readable medium as used herein refers to any non-transitory medium or combination of media that participates in providing instructions to a processor for execution. Such a medium comprises all computer readable media except for a transitory, propagating signal. For example, such computer readable medium may include a CD-ROM, a floppy disk, a hard drive, a digital versatile disk (DVD), a Blu-ray disk, or any other memory associated with the computer 600.

INDUSTRIAL APPLICABILITY

The present disclosure relates, generally, to manufacturing machines and, more particularly, to systems and methods for manufacturing a part that utilize correlated CAD and CAM instructions. The systems and methods disclosed herein may be useful in providing streamlined operations for additive and/or subtractive manufacturing processes utilizing CAM instructions that are based on CAD instructions.

Utilizing the systems and methods presented herein, a designer for a part can intelligently design the part in a CAD environment, while being mindful of the conditions and specifications necessary for the part build by a machine. In generating CAM instructions based on CAD instructions, characteristics of materials to be deposited and/or expected part performance properties may need to be considered. Therefore, using the systems and methods of the present disclosure, such material characteristics and part performance properties can be considered in the CAD environment to generate a smart model for manufacture of the part. CAM instructions may include multiple options for achieving an analogous operation in a CAM environment; therefore, the ability to specify a CAD operation specifically correlated with a CAM operation, while in the CAD environment, may achieve desired part performance. As such, use of correlated operations in CAM and CAD environments can reduce the need of complicated decomposition processes and may allow the designer to specify more options for enabling manufacture of the part. By designing the CAD instructions in a specific way, the designer of the CAD instructions can control the way the part is made.

As supplied, the apparatus may or may not be provided with a tool or workpiece. An apparatus that is configured to receive a tool and workpiece is deemed to fall within the purview of the claims recited herein. Additionally, an apparatus that has been provided with both a tool and workpiece is deemed to fall within the purview of the appended claims. Except as may be otherwise claimed, the claims are not deemed to be limited to any tool depicted herein.

All references, including publications, patent applications, and patents, cited herein are hereby incorporated by reference. The description of certain embodiments as "preferred" embodiments, and other recitation of embodiments, features, or ranges as being preferred, is not deemed to be limiting, and the claims are deemed to encompass embodiments that may presently be considered to be less preferred. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. The description herein of any reference or patent, even if identified as "prior," is not intended to constitute a concession that such reference or patent is available as prior art against the present disclosure.

What is claimed is:

1. A system for manufacturing a part, the system comprising:

a hybrid manufacturing machine, the manufacturing machine including at least one additive manufacturing tool and at least one subtractive manufacturing tool;

a computer aided drafting (CAD) controller configured to determine CAD instructions based on a CAD model, the CAD instructions including a plurality of CAD operation control functions in an ordered sequence based on a process plan;

a computer aided manufacturing (CAM) controller operatively associated with the CAD controller and configured to determine CAM instructions based on the CAD instructions, the CAM instructions including a plurality of additive and subtractive CAM operation control functions together which forms a part build plan;

a computer numerical control (CNC) controller operatively associated with the manufacturing machine and configured to control the at least one additive manufacturing tool and at least one subtractive manufacturing tool based on the CAM instructions; and wherein at least one of the plurality of CAM operation control functions is correlated with at least two of the plurality of CAD operation control functions of the CAD instructions and at least two of the CAM operation control functions are correlated with a single CAD operation control function.

2. The system of claim 1, wherein at least one CAM operation control function includes both an additive and subtractive function and the additive and subtractive functions are correlated with a single CAD operation control function.

3. The system of claim 1, wherein the CAD controller is configured to provide correlations between the plurality of CAM operation control functions and the plurality of CAD operation control functions.

4. The system of claim 1, wherein the CAD controller is configured to generate the CAD instructions based on material properties guidelines, the material properties guidelines based on material properties of materials used by the hybrid manufacturing machine in manufacturing the part.

5. The system of claim 1, wherein the plurality of CAD operation control functions include, at least, extrude, revolve, and sweep functions, the plurality CAM operation control functions include, at least, a deposition function, and each of the extrude, revolve, and sweep functions are correlated with the deposition function.

6. The system of claim 1, wherein the plurality of CAD operation control functions include, at least, a selective sweep function, the plurality of CAM operation control functions include, at least, a binary deposition function, and the selective sweep function is correlated with the binary deposition function.

7. The system of claim 2, wherein at least one additive function is configured to generate a near-net shape and at least one subtractive function is configured to finish the near-net shape into the part.

8. The system of claim 1, wherein the plurality of CAD control functions include, at least, a cut function, the plurality of CAM control functions include, at least, milling and turning functions, and the cut function is correlated with at least one of the milling and the turning functions.

9. The system of claim 1, wherein the plurality of CAD operation control functions include, at least, a hole function, the plurality of CAM operation control functions include, at least, a drilling function, and the hole function is correlated with the drilling function.

10. The system of claim 1, wherein the plurality of CAD operation control functions include, at least, a chamfer function, the plurality of CAM operation control functions includes, at least, an additive chamfer function and a subtractive chamfer function, and the chamfer function is correlated with the additive chamfer function and the subtractive chamfer function.

11. The system of claim 1, wherein the plurality of CAD operation control functions include, at least, a fillet function, the plurality of CAM operation control functions includes, at least, an additive fillet function and a subtractive fillet function, and the fillet function is correlated with the additive fillet function and the subtractive fillet function.

12. The system of claim 1, wherein the part build plan is based on, at least, the process plan of the CAD instructions.

13. The system of claim 12, wherein the process plan includes, at least, a pattern for layer deposition.

14. A method for manufacturing a part using a manufacturing machine, the manufacturing machine including at least one additive manufacturing tool and at least one subtractive manufacturing tool, the method including:

receiving CAD instructions for manufacturing the part, the CAD instructions including a plurality of CAD operation control functions;

determining CAM instructions based on, at least, the CAD instructions, the CAM instructions including a plurality of additive and subtractive CAM operation control functions;

guiding a first toolpath of the at least one additive manufacturing tool and a second toolpath of the at least one subtractive manufacturing tool based on the CAM instructions; and wherein and at least two of the CAM operation control functions are correlated with a single CAD operation control function.

15. The method of claim 14, wherein at least one CAM operation control function includes both an additive and subtractive function and the additive and subtractive functions are correlated with a single CAD operation control function.

16. The method of claim 15, wherein the additive function is configured to generate a near-net shape and the subtractive function is configured to finish the near-net shape into the part.

17. The method of claim 14, further comprising correlating the plurality of CAM operation control functions with the CAD operation control functions.

18. The method of claim 14, wherein correlating the plurality of CAM operation control functions with the CAD operation control functions includes correlating extrude, revolve, and sweep functions of the CAD operation control functions with a deposition function of the CAM operation control functions.

19. The method of claim 14, wherein correlating the plurality of CAM operation control functions with the CAD operation control functions includes correlating a cut function of the CAD operation control functions with at least one of a milling function and a turning function of the CAM operation control functions.

20. A manufacturing machine comprising:
a processing head assembly for additive manufacturing;
a subtractive manufacturing tool;
a computer numerical control (CNC) controller operatively associated with the manufacturing machine and configured to control the processing head and the subtractive manufacturing tool based on computer aided manufacturing (CAM) instructions; and
a CAM controller operatively associated with the CNC controller and configured to determine the CAM instructions based on computer aided drafting (CAD) instructions, the CAM instructions including a plurality of additive and subtractive CAM operation control functions, wherein at least one of the plurality of CAM operation control functions is correlated with at least two of a plurality of CAD operation control functions of the CAD instructions and at least two of the CAM operation control functions are correlated with a single CAD operation control function.

* * * * *